US012659990B2

(12) United States Patent　　　(10) Patent No.:　US 12,659,990 B2
Wang　　　　　　　　　　　　　　　(45) Date of Patent:　　Jun. 16, 2026

(54) METHOD, DEVICE, AND MEDIUM FOR COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 18/272,021

(22) PCT Filed: Jan. 14, 2021

(86) PCT No.: PCT/CN2021/071947
§ 371 (c)(1),
(2) Date: Jul. 12, 2023

(87) PCT Pub. No.: WO2022/151289
PCT Pub. Date: Jul. 21, 2022

(65) Prior Publication Data
US 2024/0073944 A1　　Feb. 29, 2024

(51) Int. Cl.
*H04W 74/0808*　　(2024.01)
*H04B 7/0408*　　(2017.01)
(Continued)

(52) U.S. Cl.
CPC ...... *H04W 74/0808* (2013.01); *H04B 7/0408* (2013.01); *H04B 7/06952* (2023.05)

(58) Field of Classification Search
CPC ............. H04W 74/0808; H04W 76/18; H04W 74/0891; H04B 7/0408; H04B 7/06952
See application file for complete search history.

(56) References Cited

U.S. PATENT DOCUMENTS

| | | | | |
|---|---|---|---|---|
| 11,381,981 B2 * | 7/2022 | Yerramalli | .......... | H04W 72/541 |
| 2018/0115996 A1 | 4/2018 | Si et al. | | |

(Continued)

FOREIGN PATENT DOCUMENTS

| | | |
|---|---|---|
| CN | 110301147 A | 10/2019 |
| JP | 2020-511052 A | 4/2020 |

(Continued)

OTHER PUBLICATIONS

JP Office Action for JP Application No. 2023-542821, mailed on Jan. 28, 2025 with English Translation.

(Continued)

*Primary Examiner* — Harry H Kim
(74) *Attorney, Agent, or Firm* — Sughrue Mion, PLLC

(57)　　　　　　ABSTRACT

Embodiments of the present disclosure relate to a method, device, and medium for communication. A communication method comprises performing a plurality of channel access procedures on a shared channel with a plurality of sensing beams, each of the plurality of sensing beams being associated with at least one of a plurality of signals, the plurality of signals comprising a plurality of synchronization signal blocks (SSBs). The method also comprises in accordance with a determination that at least one of the plurality of channel access procedures is successful, determining at least one transmission beam for at least one of the plurality of signals based on at least one of the plurality of sensing beams with which the at least one successful channel access procedure is performed; and transmitting the at least one signal on the shared channel using the at least one transmission beam.

18 Claims, 12 Drawing Sheets

(51) Int. Cl.
*H04B 7/06* (2006.01)
*H04W 74/08* (2024.01)
*H04W 76/18* (2018.01)

(56) References Cited

U.S. PATENT DOCUMENTS

| | | | |
|---|---|---|---|
| 2019/0059106 A1* | 2/2019 | Zhang | H04W 56/001 |
| 2019/0110314 A1* | 4/2019 | Abedini | H04W 74/0891 |
| 2020/0037169 A1 | 1/2020 | Chendamarai Kannan et al. | |
| 2020/0245157 A1 | 7/2020 | Chande et al. | |
| 2020/0252806 A1* | 8/2020 | Yerramalli | H04B 7/0695 |
| 2021/0360600 A1* | 11/2021 | Chendamarai Kannan | H04B 7/0408 |
| 2022/0346148 A1* | 10/2022 | Yang | H04W 74/0816 |
| 2024/0073949 A1* | 2/2024 | Bhamri | H04B 7/06968 |

FOREIGN PATENT DOCUMENTS

| | | | |
|---|---|---|---|
| WO | 2018/107951 A1 | 6/2018 | |
| WO | 2020/160506 A1 | 8/2020 | |

OTHER PUBLICATIONS

JP Office Action for Japanese Patent Application No. 2023-542821, mailed on Sep. 3, 2024 with English Translation.
Convida Wireless, "Design considerations on channel accessing", 3GPP TSG-RAN WG1 Meeting #94 Bis, R1-1811625, Chengdu, China, Aug. 12, 2018, pp. 1-5.
International Search Report for PCT/CN2021/071947 dated Oct. 15, 2021.
Written Opinion for PCT/CN2021/071947 dated Oct. 15, 2021.
Extended European Search Report for EP Application No. 21918497. 5, dated on Feb. 16, 2024.

* cited by examiner

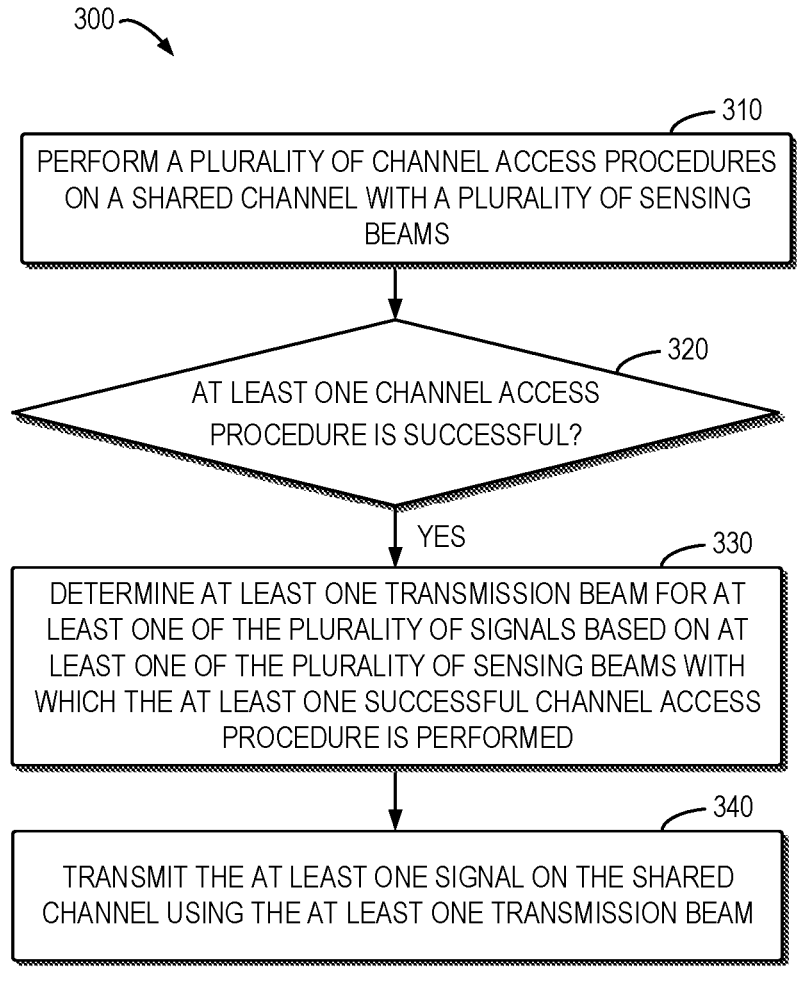

300

310

PERFORM A PLURALITY OF CHANNEL ACCESS PROCEDURES ON A SHARED CHANNEL WITH A PLURALITY OF SENSING BEAMS

320

AT LEAST ONE CHANNEL ACCESS PROCEDURE IS SUCCESSFUL?

YES        330

DETERMINE AT LEAST ONE TRANSMISSION BEAM FOR AT LEAST ONE OF THE PLURALITY OF SIGNALS BASED ON AT LEAST ONE OF THE PLURALITY OF SENSING BEAMS WITH WHICH THE AT LEAST ONE SUCCESSFUL CHANNEL ACCESS PROCEDURE IS PERFORMED

340

TRANSMIT THE AT LEAST ONE SIGNAL ON THE SHARED CHANNEL USING THE AT LEAST ONE TRANSMISSION BEAM

Fig. 3

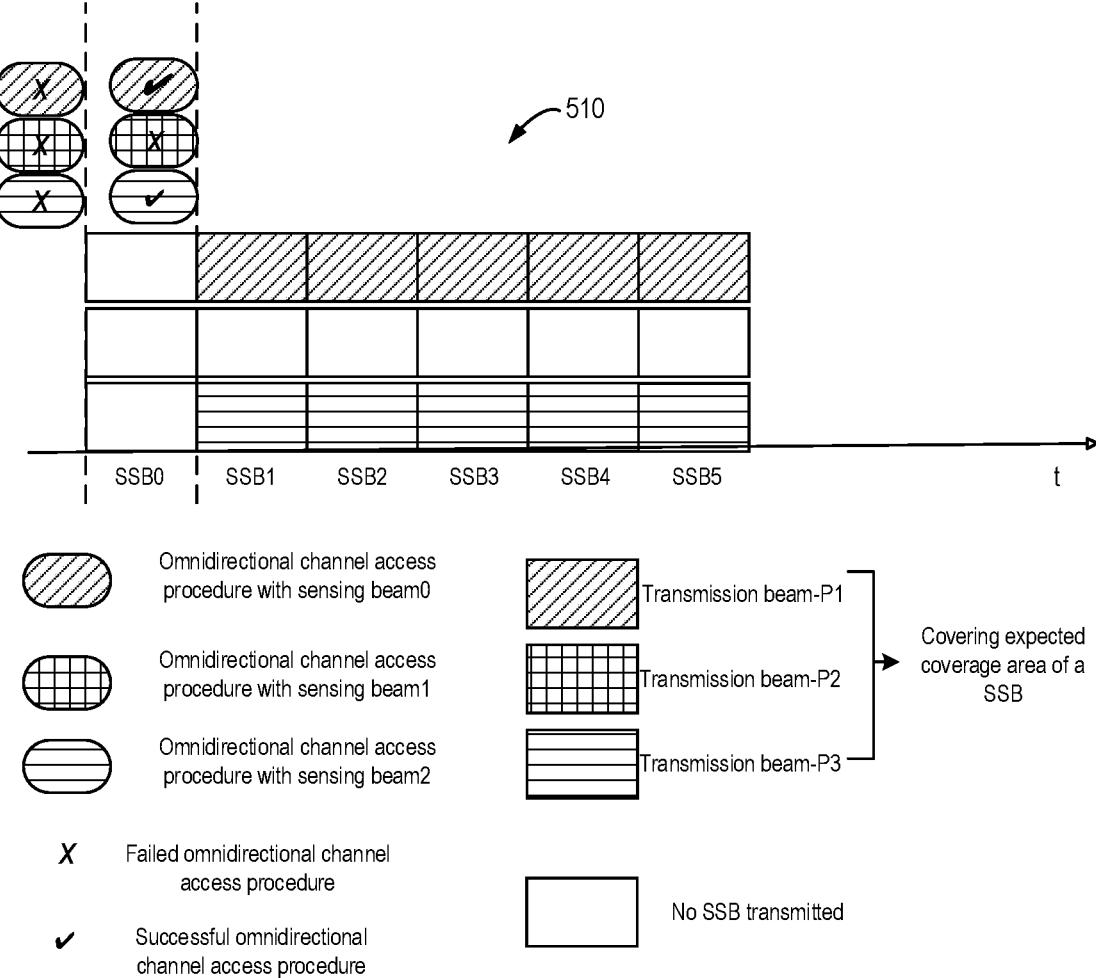

510

SSB0    SSB1    SSB2    SSB3    SSB4    SSB5    t

Omnidirectional channel access procedure with sensing beam0

Omnidirectional channel access procedure with sensing beam1

Omnidirectional channel access procedure with sensing beam2

*X*    Failed omnidirectional channel access procedure

✔    Successful omnidirectional channel access procedure

Transmission beam-P1

Transmission beam-P2

Transmission beam-P3

Covering expected coverage area of a SSB

No SSB transmitted

Fig. 5B

METHOD, DEVICE, AND MEDIUM FOR COMMUNICATION

CROSS REFERENCE TO RELATED APPLICATIONS

This application is a National Stage of International Application No. PCT/CN2021/071947 filed Jan. 14, 2021.

TECHNICAL FIELD

Embodiments of the present disclosure generally relate to the field of telecommunication, and in particular, to a method, device, and medium for communication.

BACKGROUND

Wireless communication systems may operate in high frequency range such as millimeter wave (mmWave) frequency ranges, e.g., from 52.6 GHz to 71 GHz, etc. Wireless communications at these frequencies can provide high data rates and low latency as well as being accompanied by increased signal attenuation (e.g., path loss). As a result, signal processing techniques, such as beamforming, may be used to overcome the path losses at these frequencies. Due to the increased amount of path loss in mmWave communication systems, transmissions from the network device and/or the terminal device may be beamformed.

In a radio access network such as a new radio (NR) network, a network device may transmit discovery related reference signals (for example, synchronization signal blocks (SSBs)) to allow terminal devices to search and acquire synchronization to a cell within the radio access network. In some instances, a network device may transmit SSBs repeatedly at a predetermined periodicity. In the case of beamforming, the network device may transmit SSBs in different directions using transmission beams. When the network device operates in a shared channel or unlicensed frequency spectrum, the network device may determine whether other devices are using the shared channel in the different directions before transmitting signals, including transmitting SSBs. A channel access procedure may be performed to determine whether the shared channel is idle or being used.

SUMMARY

In general, example embodiments of the present disclosure provide a solution of transmission of SSBs.

In a first aspect, there is provided a method for communication. The method comprises performing a plurality of channel access procedures on a shared channel with a plurality of sensing beams, each of the plurality of sensing beams being associated with at least one of a plurality of signals, the plurality of signals comprising a plurality of synchronization signal blocks (SSBs); in accordance with a determination that at least one of the plurality of channel access procedures is successful, determining at least one transmission beam for at least one of the plurality of signals based on at least one of the plurality of sensing beams with which the at least one successful channel access procedure is performed; and transmitting the at least one signal on the shared channel using the at least one transmission beam.

In a second aspect, there is provided a network device. The network device includes a processing unit; and a memory coupled to the processing unit and storing instructions thereon, the instructions, when executed by the processing unit, causing the device to perform the method according to the first aspect.

In a third aspect, there is provided a computer readable medium having instructions stored thereon, the instructions, when executed on at least one processor, causing the at least one processor to carry out the method according to the first aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 3 is a flowchart of an example method of SSB transmission in accordance with some embodiments of the present disclosure;

FIGS. 5A-5C illustrate example SSB transmission schemes based on omnidirectional channel access according to some embodiments of the present disclosure;

Throughout the drawings, the same or similar reference numerals represent the same or similar element.

DETAILED DESCRIPTION

Figure 1:
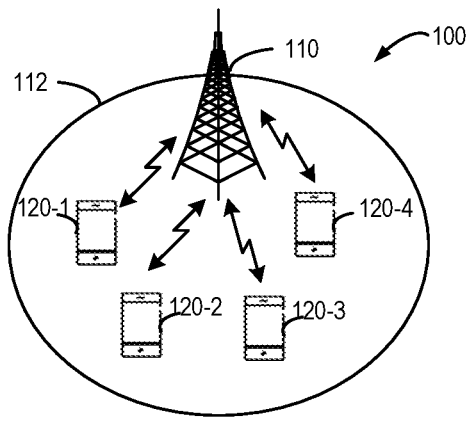
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RIH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) DEVICES, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Example Environment

FIG. 1 shows an example communication environment 100 in which example embodiments of the present disclosure can be implemented. In the example of FIG. 1, a network device 110 is deployed to serve one or more terminal devices, e.g., terminal devices 120-1, 120-2, 120-3, 120-4, etc., that are located within its coverage range. The coverage range of the network device 110 is called as a cell 102. For ease of discussion, the terminal devices 120-1, 120-2, 120-3, and 120-4 may collectively referred to as terminal devices 120. The terminal devices 120 may be dispersed throughout the coverage area of the network device 110, and each terminal device 120 may be stationary or mobile.

It is to be understood that the number of devices and their connections shown in FIG. 1 are only for the purpose of illustration without suggesting any limitation. The environment 100 may include any suitable number of network devices and/or terminal devices adapted for implementing embodiments of the present disclosure. Although not shown, it would be appreciated that one or more additional terminal devices may be located in the cell 102, and one or more additional cells may be deployed in the environment 100.

Communications between the terminal device 120 and the network device 110 may be implemented according to any proper communication protocol(s). Communication in a direction from a terminal device 120 towards the network device 110 is referred to as UL communication, while communication in a reverse direction from the network device 110 towards the terminal device 120 is referred to as DL communication.

In UL communication, the terminal device 120 may transmit UL data and control information to the network device 110 via a UL channel. In some examples, the UL data may be transmitted in a physical uplink shared channel (PUSCH) and/or any other UL channels that are available used for data transmission. In some examples, the UL control information may be transmitted in a physical uplink control channel (PUCCH) and/or any other UL channels that are available for transmission of control information. In DL transmission, the network device 110 may transmit DL data and control information to the terminal device 120 via a DL channel. In some examples, the DL data may be transmitted in a physical downlink shared channel (PDSCH) and/or any other DL channels that are available used for data transmission. In some examples, the DL control information may be transmitted in a physical uplink control channel (PDCCH) and/or any other DL channels that are available for transmission of control information.

In some example embodiments, for example, in a millimeter wave (mmWave) system, directional or beamformed transmissions (e.g., transmission beams) may be utilized for communications. For example, the network device 110 may transmit signals and perform contention procedures on multiple transmission beams (e.g., associated with different coverage areas). A beam is generated using an antenna array (including a plurality of antennas) associated with a communication device (e.g., the network device 110). A beam is the main lobe of the radiation pattern of the antenna or antenna array. The network device 110 may select different subsets of antennas to generate different beams.

In some cases, the network device 110 may engage in beam sweeping over a portion of or all possible transmission beams for messages or signals intended for wireless devices distributed throughout its coverage range (e.g., the cell 102). For example, the network device 110 may transmit a plurality of signals using respective transmission beams to facilitate cell synchronization and discovery by the terminal devices throughout the coverage range. The plurality of signals may include synchronization signal blocks (SSBs).

Generally, the time, frequency, and spatial resources for each SSB may be preconfigured. Each SSB may be configured with an expected transmission beam which covers an expected coverage area in the cell 102 of the network device 110. A combination of the SSBs may cover the whole cell 102, to allow terminal devices 120 dispersed the cell 102 to have opportunities to receive the SSBs.

Figure 2:
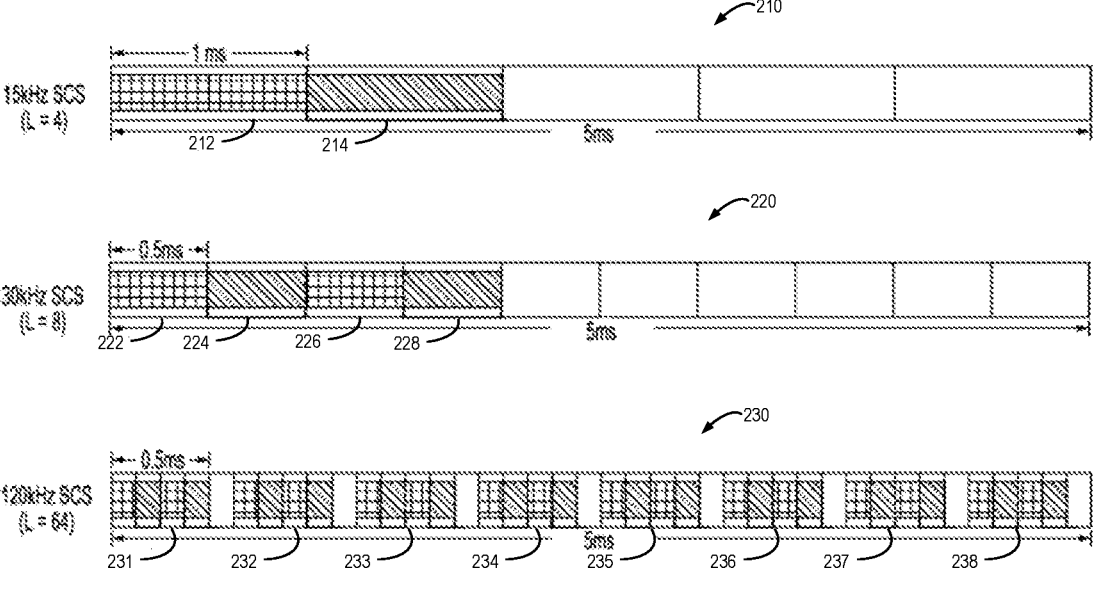
FIG. 2 illustrates some example transmission patterns for SSB.

FIG. 2 illustrates some example transmission patterns for a number of SSBs. In those examples, SSBs can be transmitted during a certain time period, for example a half frame (e.g., 5 ms). According to a transmission pattern 210, if the subcarrier spacing (SCS) is 15 kHz, a total number of four (4) SSBs may be transmitted, where the first two SSBs may be transmitted in a time slot 212 and the other two SSBs may be transmitted in a time slot 214 among the time period of 5 ms. According to a transmission pattern 220, if the SCS is 30 kHz, a total number of eight (8) SSBs may be transmitted, where each two SSBs may be transmitted in one of time slots 222, 224, 226, and 228. According to a transmission pattern 230, if the SCS is extended to 120 kHz, the number of SSBs may be increased to 64, each eight of the 64 SSBs being transmitted in one of time slots 231 to 238.

In the transmission pattern 210 or 220, the network device 110 may be able to perform cyclic transmission of one or more SSBs in the following time slots in order to improve the reliability of the SSB transmission. In the transmission pattern 230, due to the large number of SSBs, there is time remaining for cyclic transmission in the time period of 5 ms. Thus, the possibility of failed reception of the SSBs may be increased.

Further, in communication systems based on a shared channel, the network device may perform a channel access procedure to contend for access to the channel prior to transmitting a SSB on the identified transmission beam. The SSB is transmitted when the shared channel is detected to be idle. The channel access procedure may be performed with respect to a certain sensing beam with certain coverage areas. It is expected that a SSB is transmitted with a transmission beam in a direction that is sensed as idle, which may avoid the collision with other devices on the shared channel and increase the probability of successful reception of the SSB. Therefore, there raises challenge in the SSB transmission procedures in order to prove more flexibility to address the channel sensing.

Work Principle and Example Method

According to example embodiments of the present disclosure, there is proposed a solution for SSB transmission. In this solution, a plurality of sensing beams are determined to be associated with one or more of a plurality of signals including SSBs. A plurality of channel access procedures are performed by a communication device, e.g., a network device, with the plurality of sensing beams. Depending on the results of the channel access procedures, a signal associated with a sensing beam with which a successful channel access procedure is performed can be transmitted using at least one transmission beam. The at least one transmission beam for the signal is determined based on the sensing beam with which the successful channel access procedure is performed, instead of directly using an expected transmission beam of this signal. The at least one determined transmission beam may partially or fully cover the expected transmission beam of the signal.

In this way, the flexibility of SSB transmission can be improved, and there may be more opportunities to transmit a SSB in at least a partial expected transmission beam in the case of a successful channel access procedure.

Some example embodiments of the present disclosure will be described in detail below. Reference is first made to FIG. 3, which illustrates a flowchart of an example method 300 for SSB transmission implemented by a network device in accordance with some embodiments of the present disclosure. For example, the method 300 may be performed at the network device 110. For the purpose of discussion, the method 300 will be described with reference to FIG. 1.

At block 310, the network device 110 performs a plurality of channel access procedures on a shared channel with a plurality of sensing beams. The shared channel is on an unlicensed frequency band, which cannot be in exclusive use. The shared channel may also be referred to as shared frequency spectrum, an unlicensed channel, an unlicensed frequency band, unlicensed frequency spectrum, or the like, and such terms are used interchangeably herein.

To access a shared channel, for example, to transmit a SSB on the shared channel, a device may perform a channel access procedure to sense whether the shared channel is free for use or is used by other devices. If a sensing result of the channel access procedure indicates that the shared channel is idle, the network device 110 may determine that the channel access procedure is successful. Otherwise, if the sensing result indicates that the shared channel is used by other devices, the channel access procedure is determined to be failed.

In some example embodiments, the network device 110 may perform the plurality of channel access procedures utilizing beamforming capabilities of associated antennas. More particularly, the network device 110 may perform the plurality of channel access procedures on the shared channel by using a plurality of subsets of antennas. For example, the network device 110 may perform a first channel access procedure using a first subset of antennas, perform a second channel access procedure using a second access procedure, and so on. The use of the plurality of subsets of antennas can generate different beams (i.e., sensing beams). The plurality of subsets of antennas are different so that the generated sensing beams are different.

In some example embodiments, a channel access procedure may involve at least energy detection to determine if the shared channel is being used before transmission on the channel. In a channel access procedure, the network device 110 may monitor the shared channel with a sensing beam and detect the energy level on the shared channel. If the detected energy level is less than or equal to a threshold (e.g., an energy detection threshold), the network device 110 may determine that the shared channel is not used by other devices. Thus, the channel access procedure is determined to be successful. In some example embodiments, a channel access procedure may be performed based on LBT or clear channel assessment (CCA). Sometimes, the channel access procedure may also be referred to as a LBT procedure or a CCA procedure.

A sensing beam covers a specific coverage area monitored by the network device 110 in a channel access procedure. A sensing beam may also be referred to as a channel access beam, a LBT beam, or other terms. The coverage area may be corresponding to a beam direction of the sensing beam in a certain plane (for example, in a horizontal plane or a vertical plane) or in a 3D spatial dimension. Thus, a coverage area may be a plane area or a 3D spatial area. If a channel access procedure performed with a certain sensing beam is successful, it may be determined that no other devices from the corresponding coverage area are using the shared channel.

Traditionally, one omnidirectional channel access procedure is performed with a single omnidirectional sensing beam before a time period available for transmitting a plurality of SSBs. If the omnidirectional channel access procedure is failed, any of the plurality of SSBs can be transmitted. If the omnidirectional channel access procedure is successful, a network device can transmit the plurality of SSBs according to their configurations. The omnidirectional channel access procedure provides less flexibility in SSB transmission.

According to example embodiments of the present disclosure, a plurality of channel access procedures are performed with different sensing beams. An association relationship between sensing beams and a plurality of signals to be transmitted by the network device 110 may be defined in advance. Each of the plurality of sensing beams is associated with at least one of a plurality of signals. In some example embodiments, each of the plurality of signals is associated with two or more of the plurality of sensing beams. Different signals may be associated with one or more same sensing beams.

In some example embodiments, the plurality of signals to be transmitted may include at least a plurality of synchronization signal blocks (SSBs). An SSB may include one or more types of synchronization signals, such as a primary synchronization signal (PSS), a secondary synchronization signal (SSS), or the like. In some example embodiments, a signal of the plurality of signals may include at least a combination of a SSB with a physical broadcast channel (PBCH). In some example embodiments, a signal of the plurality of signals may further one or more of information blocks such as one or more other broadcast system blocks. In some examples, the signal that includes at least a SSB/PBCH may include a PSS, a SSS, a PBCH with associated demodulation reference signal (DM-RS). In some examples, the signal may also include a control-resource set (CORE-SET) for Physical Downlink Control Channel (DPDCCH) scheduling Physical Downlink Shared Channel (PDSCH) with System Information Block (SIB) (e.g., SIBI), and PDSCH carrying SIBI and/or non-zero power CSI reference signals (CSI-RS). In one embodiment, the signal may include a discovery signal or discovery reference signal.

In some example embodiments, the plurality of signals may be transmitted in a designated time period available for transmission. The time period may sometimes be referred to as a SSB burst set transmission window. The designated time periods may be repeated at a predetermined periodicity. In some examples, the time period may have a duration of channel occupancy time (COT) or maximum channel occupancy time (MCOT), e.g., 5 ms. Other durations may also be possible.

Generally, each of the plurality of signals may be configured to be transmitted to an expected coverage area. All the expected coverage areas of the plurality of signals may be combined to cover the whole spatial coverage range of the network device 110. The sensing beam associated with one or more signals may be defined to have a coverage area that covers at least the expected coverage areas of the one or more signals.

In some example embodiments, the association relationship between the sensing beams and the signals to be transmitted may include a multiple-to-one relationship, where a group of more than one sensing beam is each associated with a single signal to be transmitted (e.g., a SSB). The coverage area of the sensing beam may be determined based on the associated signal. In such examples, a sensing beam associated with a single signal may have a coverage area covering a part of the expected coverage area, thus the sensing beam may be relatively narrow. A channel access procedure performed with such a narrow sensing beam may be referred to as a directional channel access procedure since the network device 110 may need to monitor the shared channel in a small beam direction.

In some example embodiments, the association relationship may include a multiple-to-multiple relationship, where more than one wide sensing beam is associated with more than one signal to be transmitted (e.g., a SSB). In such examples, a group of sensing beams may be associated with two or more signals, with each wide sensing beam having a large coverage area covering a part of the total expected coverage area of the two or more signals. Such a sensing beam may be relatively wide. A channel access procedure performed with such a wide sensing beam may be referred to as a pseudo-omnidirectional (or quasi-omnidirectional) channel access procedure since the network device 110 may need to monitor the shared channel in a relatively wide beam direction covering both the two or more signals.

In some example embodiments, the association relationship may include a multiple-to-all relationship, where each of the plurality of signals (e.g., a plurality of SSBs) may be considered as associated with all the plurality of sensing beams. Each sensing beam may be an omnidirectional sensing beam with an omnidirectional range covering the plurality of signals in a certain plane (e.g., in a horizontal plane, in a vertical plane, or any other plane). The plurality of omnidirectional sensing beams are different in their 3D coverage and may thus have different coverage areas in a 3D spatial dimension. As such, the total coverage area of the plurality of omnidirectional sensing beams covers all the coverage areas of the plurality of signals. That is, the coverage range of the network device 110 (which is substantially equivalent to the total coverage area of all the expected coverage areas of the plurality of signals) are divided into a plurality of coverage areas in a horizontal direction, a vertical direction or the like, each coverage area being covered by an omnidirectional sensing beam. A channel access procedure performed with such omnidirectional sensing beam may be referred to as an omnidirectional channel access procedure.

The example types of association relationships between the sensing beams and the plurality of signals to be transmitted may be summarized in the below Table 1. It is assumed that the number of signals to be transmitted is L.

TABLE 1

Example association relationships

| Type of Association Relationship | Index of Sensing Beam | Index of Signal |
|---|---|---|
| Multiple-to-one | b00, b01, . . . , b0i | 0 |
| | b10, b11, . . . , b1j | 1 |
| | . . . | . . . |
| | bL1, bL2, . . . , bLn | L |
| Multiple-to-multiple | b00, b01, . . . , b0x | 0, 1, . . . , k |
| | b10, b11, . . . , b1y | k + 1, k + 2, . . . , j |
| | . . . | . . . |
| | bL1, bL2, . . . , bLz | m, m + 1, . . . , L |
| Multiple-to-all | 0, 1, . . . , p | 0, 1, . . . , L |

In some example embodiments, in performing the plurality of channel access procedure at block 310, the network device 110 may employ one or more of the above association relationships to define the sensing beams used for the channel access procedure. At least depending on the sensing beams used and/or the channel access policy for SSB switching, the network device 110 may perform the channel access procedures in different schemes which will be described in greater detail below.

At block 320, the network device 110 determines whether at least one of the plurality of channel access procedures is successful. If one or more channel access procedures are successful, the network device 110 determines that one or more associated signals may be transmitted to at least a part of their expected coverage area. The one or more associated signals (referred to as "target signals" sometimes) are those associated with the one or more sensing beams with which the one or more channel access procedures are performed.

Therefore, at block 330, if the at least one successful channel access procedure is determined, the network device 110 determines at least one transmission beam for the at least one signal based on the at least one sensing beam with which the at least one successful channel access procedure is performed. For example, the network device 110 may select at least one subset of antennas that pass the channel access procedure to generate at least one transmission beam for transmitting the at least one signal.

In some example embodiments, for each signal that can be transmitted according to the results of the channel access procedures, one or more transmission beams may be determined for transmitting the signal. In some example embodiments, the one or more transmission beams for the signal may at least partially overlap or cover the at least one sensing beam. As used herein, a transmission beam(s) covering or overlapping with one or more sensing beam(s) means that a (total) coverage area of the transmission beam(s) is overlapped with a (total) coverage area of the sensing beam(s).

In an example embodiment, if the at least one sensing beam associated with a signal is determined to cover the whole expected coverage area, a transmission beam may be determined as the expected transmission beam for that signal, which has the expected coverage area as configured this signal. In an example embodiment, if the channel access procedure is successful in one or more but not all of the associated sensing beams, the one or more sensing beams associated with this signal may be determined to cover a part of the expected coverage area of this signal. Therefore, at least one of the plurality of signals may be transmitted to at least a part of its (their) expected coverage area(s) in the case that at least one channel access procedure is successful.

At block 340, the network device 110 transmits the at least one signal on the shared channel using the at least one transmission beam. The network device 110 may control its antenna array to radiate the at least one transmission beam for transmitting the at least one signal. In some example embodiments, each signal may be configured with a time resource (e.g., a time slot, also referred to as a time domain position) for transmission during a time period available for transmission. The network device 110 may transmit a signal in its configured time slot during the time period.

At least depending on the sensing beams (directional, omnidirectional, and/or pseudo-omnidirectional sensing beams) used and/or the channel access policy for SSB switching, different channel access procedures may be performed and thus different transmission schemes may be performed. Some example embodiments for transmission schemes will be described with greater details in the following with reference to FIGS. 4-9.

Example Directional Channel Access-Based SSB Transmission

Figure 4:
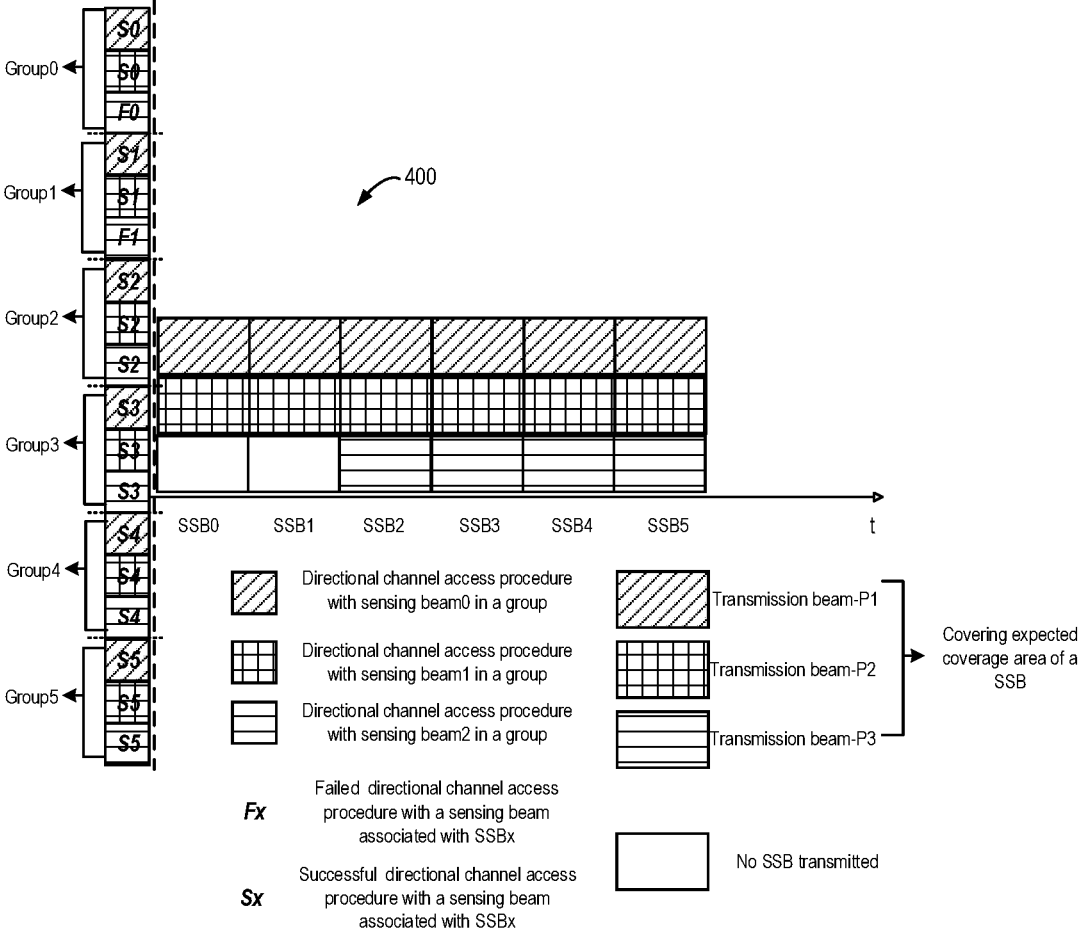
FIG. 4 illustrates an example SSB transmission scheme based on directional channel access according to some embodiments of the present disclosure.

FIG. 4 illustrates an example SSB transmission scheme 400 based on directional channel access according to some embodiments of the present disclosure. In FIG. 4 as well as in the following FIGS. 5A-9, the signals to be transmitted by the network device 110 are illustrated as SSBs, although it would be appreciated that other blocks/signals may also be included and transmitted. For the purpose of illustration only, six SSBs are illustrated. However, it would be appreciated that a different number of SSBs or signals may be expected to be transmitted by the network device 110. It would be appreciated that except for the number of SSBs, the grouping of the sensing beams and the number of sensing beams in the examples illustrated in FIG. 4 and following FIGS. 5A-9 are merely for the purpose of illustration and other grouping and number are also applicable.

In some example embodiments related to directional channel access-based SSB transmission, the network device 110 may perform a plurality of channel access procedures with a plurality of groups of directional sensing beams, each group comprising at least two directional sensing beams and being associated with a respective one of the plurality of SSBs. Thus, each SSB may be associated with the two or more directional sensing beams within a group. Accordingly, the sensing beams and the SSBs have a multiple-to-one association relationship, as described above. In some example embodiments, the network device 110 may reference to Table 1 to determine the association between the sensing beams and the SSBs. For example, sensing beams indexed with "b00, b01, . . . , b0i" may be associated with a signal (e.g., SSB here) indexed with "0," sensing beams indexed with "b10, b11, . . . , b1j" may be associated with a signal (e.g., SSB here) indexed with "1," and so on. In some example embodiments, all the directional sensing beams in the plurality of groups may together cover a total expected coverage area of the plurality of SSBs.

In the illustrated example in FIG. 4, there are six groups (numbered as Group0 to Grop5) of directional sensing beams associated with the six SSBs (numbered as SSB0 to SSB5), respectively, each group including three directional sensing beams (numbered as sensing beam0, sensing beam1, and sensing beam2). It is to be noted that although the sensing beams in different groups are not the same.

Each directional sensing beam within a group may be determined to partially cover an expected coverage area of the associated SSB. Thus, each directional sensing beam is narrower than an expected transmission beam of the associated SSB. The two or more directional sensing beams within the group may have a total coverage area overlapped with the expected coverage area of the associated SSB. For example, three sensing beams in Group0 in FIG. 4 are associated with SSB0, and a total coverage area of the three directional sensing beams may be equal to or larger than the expected coverage area of SSB0. The other groups of directional sensing beams may also be likewise determined.

In some example embodiments, the numbers of directional sensing beams in different groups may be the same or different. Thus, although the six groups in FIG. 4 are illustrated to have a same number of three directional sensing beams, those groups may each have a different number of directional sensing beams.

The network device 110 may perform a plurality of directional channel access procedures on the shared channel with respective directional sensing beams in the plurality of groups. For each directional sensing beam, a directional channel access procedure may be performed. In some example embodiments, the plurality of directional channel access procedures may be performed before the time period available for SSB transmission, for example, at the beginning of COT. In some example embodiments, the plurality of directional channel access procedures may be performed substantially in parallel. In some examples, the same channel access parameters, such as the backoff counter, channel access priority classes, and the like, may be the same or similar for the plurality of directional channel access procedures.

In some example embodiments, the network device 110 may perform category 4 (Cat4) channel access procedures at the beginning of the time period, which allows for a relative long monitoring/sensing duration. A Cat4 channel access procedure may also be referred to as a Type 1 channel access procedure. The channel access procedure may be based on a contention window. With a successful Cat4 channel access procedure, the network device 110 may have a transmission duration, for example, a duration larger than 1 ms.

Depending on the possible usage of the shared channel by other devices, the plurality of directional channel access procedures may each be failed or successful. In some example embodiments, for each group of directional sensing beams that associated with a certain SSB, if the sensing results of all the directional sensing beams are successful, i.e., the directional channel access procedures performed with the directional sensing beams are successful, the network device 110 can determine that the SSB may be transmitted and its transmission beam may be determined to cover the total coverage area of the directional sensing beam (which also covers the expected coverage area of this SSB). In some examples, a single transmission beam (i.e., the expected transmission beam) may be determined for transmitting this SSB.

In the example of FIG. 4, directional channel access procedures performed with the three directional sensing beams in Group2 are all successful, and a transmission beam for the associated SSB (e.g., SSB2) may be determined as the expected transmission beam which covers the expected coverage area. All the directional channel access procedures are also successful in each of Group3 to Group5.

It would be appreciated that in order to better illustrate the association between the coverage of the transmission beam (s) and the sensing beams, separate transmission beam parts (e.g., Transmission beam-P1, Transmission beam-P2, and/or Transmission beam-P3) are illustrated for a single SSB in FIG. 4 as well as in following FIGS. 5A-9. One or more transmission beams may be determined to cover the transmission parts for this SSB. For example, a single transmission beam may be determined for transmitting SSB2, which covers the three transmission beam parts (Transmission beam-P1, Transmission beam-P2, and/or Transmission beam-P3). Similarly, for SSB3, SSB4, and SSB5, respective transmission beams may be determined to cover their expected coverage areas.

In some example embodiments, if at least one directional channel access procedure performed with at least one directional sensing beam in a certain group is successful while one or more other directional channel access procedure are failed, the network device 110 may determine that the SSB (e.g., SSB) associated with the certain group may be transmitted with a narrower transmission beam(s) than its expected transmission beam. The network device 110 may determine one or more transmission beams for transmitting the SSB based on at least one directional sensing beam with which the at least one successful directional channel access procedure is performed. In some example embodiment, the one or more transmission beams may be determined to partially or totally overlap with the at least one directional sensing beam. For example, a total coverage area of the one or more transmission beams may be substantially equal to or smaller than a total coverage area of the at least one directional sensing beam.

In the illustrated example in FIG. 4, in Group0, directional channel access procedures performed with sensing beam0 and sensing beam1 are successful while the directional channel access procedure performed with sensing beam2 is failed, the network device 110 may determine one or more transmission beams overlapping with sensing beam0 and sensing beam1 for transmitting SSB0. For Group1, the network device 110 may similarly determine one or more transmission beams overlapping with sensing beam0 and sensing beam1 for transmitting SSB1.

In some example embodiments, for a certain group of directional sensing beams with two or more successful directional channel access procedures, if the corresponding two or more directional sensing beams for the successful channel access procedures covers adjacent coverage areas, the network device 110 may merge the adjacent coverage areas of the two or more directional sensing beams and determine a single transmission beam covering the merged coverage area, to transmit the associated SSB. In some examples, if the two or more directional sensing beams are separated in their coverage areas, the network device 110 may determine two or more respective transmission beams each overlapping with one of the separate directional sensing beams. The transmission of the associated SSB may be performed using the two or more separate transmission beams. In the example of FIG. 4, for Group0, a single narrow transmission beam that covers Transmission beam-P1 and Transmission beam-P2 are determined for transmitting SSB0. For Group1, a single narrow transmission beam that covers Transmission beam-P1 and Transmission beam-P2 are determined for transmitting SSB1.

It would be appreciated that in the case of adjacent coverage areas, separate transmission beams may also be determined. For example, two separate transmission beams, each overlapping with sensing beam0 and sensing beam1, may be determined for transmitting SSB0 or SSB1.

With the transmission beam(s) for one or more of SSB0 to SSB5 is determined, the network device 110 may transmit the SSBs sequentially in their respective time slots during the time period (e.g., a COT) available for SSB transmission. In the example of FIG. 4, the network device 110 is configured to perform no channel access immediately before each SSB transmission switching in the middle of the time period.

In some example embodiments, if one or more of the plurality of performed directional channel access procedures are failed, the network device 110 may determine that one or more SSBs may not be transmitted at least to a coverage area of one or more directional sensing beams with which the failed channel access procedures are performed. In some examples, for a certain SSB associated with a group of directional sensing beams, if one or more of the corresponding directional channel access procedures are successful but one or more others are failed, the SSB may be partially transmitted. The network device 110 may not transmit the SSB to the coverage area of the sensing beam(s) with which a failed channel access procedure(s) is performed. For example, in FIG. 4, SSB0 and SSB1 are partially transmitted. The two SSBs are not transmitted to the coverage area covered by their Transmission-beam P3 due to the failed directional channel access procedures.

In some example embodiments, if one or more SSBs are not transmitted or partially transmitted due to one or more failed directional channel access procedures, the network device 110 may attempt to transmit the one or more SSBs in their next configured time slots (if exist) within the time period available for SSB transmission. For each directional sensing beam with which a failed directional channel access procedure occurs, the network device 110 may perform a further directional channel access procedure using the directional sensing beam. The further directional channel access procedure may be performed during the time period available for SSB transmission and before a next time slot configured for the SSB associated with the directional sensing beam.

In the example of FIG. 4, if there is a further time slot configured for transmission of SSB0 after the time slot for the last SSB (e.g., SSB5), the network device 110 may transmit a further directional channel access procedure (not shown) for SSB0 using sensing beam2 in Group0 associated with SSB0. The directional channel access procedure may be performed before the further time slot configured for transmission of SSB0. For SSB1, the network device 110 may similarly perform a further directional channel access procedure in order to transmit the two SSBs.

If the further directional channel access procedure is successful, the first device 110 may determine one or more transmission beams, the first device 110 may determine one or more transmission beams for the SSB associated with the directional sensing beam. The one or more determined transmission beams may overlap with the directional sensing beam. The network device 110 may transmit the associated SSB using the one or more transmission beams, for example, in a next time slot configured for this SSB. For example, in FIG. 4, if the further directional channel access procedure performed using sensing beam2 in Group1 is successful, the network device 110 may transmit SSB0 using a transmission beam overlapping with sensing beam2.

Example Omnidirectional Channel Access-Based SSB Transmission

In some example embodiments, the network device 110 may use a plurality of omnidirectional sensing beams to perform the plurality of channel access procedures. Each omnidirectional sensing beam is associated with the plurality of signals (e.g., SSBs) to be transmitted. Accordingly, the sensing beams and the SSBs have a multiple-to-all association relationship, as described above. In some example embodiments, the network device 110 may reference to Table 1 to determine the association between the sensing beams and the SSBs. For example, sensing beams indexed with "0, 1, . . . , p" may be associated with the plurality of signals (e.g., SSBs here) indexed with "0, 1, . . . , L."

As mentioned above, an omnidirectional sensing beam with an omnidirectional range covering the plurality of signals in a certain plane (e.g., in a horizontal plane, in a vertical plane, or any other plane). The plurality of omnidirectional sensing beams are different in their 3D coverage and may thus have different coverage areas in a 3D spatial dimension. The total coverage area of the plurality of omnidirectional sensing beams covers all the coverage areas of the plurality of SSBs.

Figure 5A:
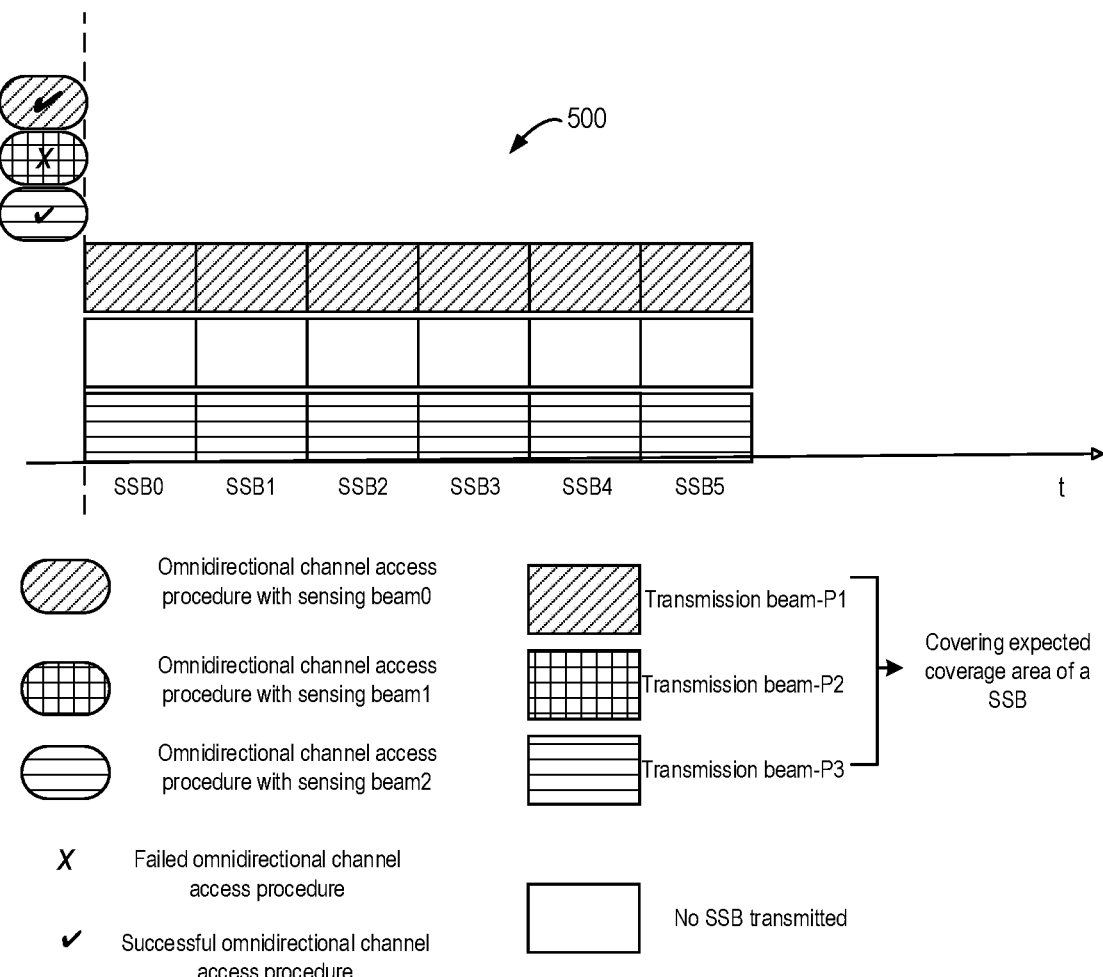
Figure 5C:
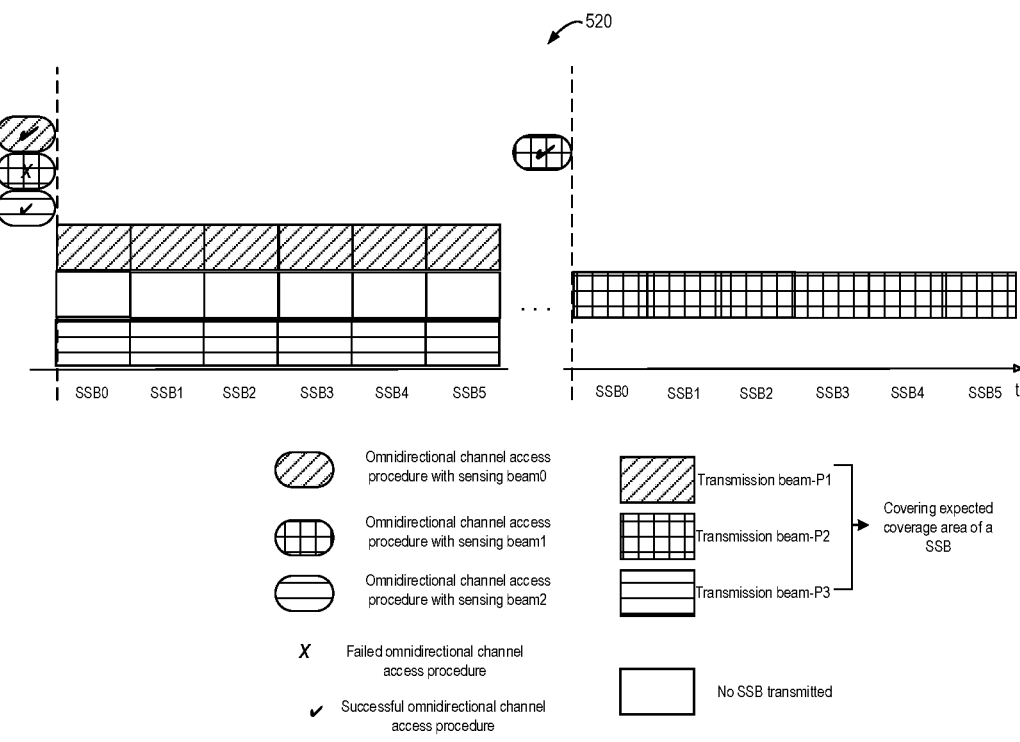

FIGS. 5A-5C illustrate some example SSB transmission schemes 500, 510 and 520 based on omnidirectional channel access. In the examples of FIGS. 5A-5C, there may be three omnidirectional sensing beams (numbered as sensing beam0, sensing beam1, and sensing beam2), each associated with the six SSBs (SSB0 to SSB5).

The network device 110 may perform a plurality of omnidirectional channel access procedures with the plurality of omnidirectional sensing beams. For each sensing beam, an omnidirectional channel access procedure may be performed. In some example embodiments, the plurality of omnidirectional channel access procedures may be performed before the time period available for SSB transmission, for example, at the beginning of COT. In some example embodiments, the plurality of omnidirectional channel access procedures may be performed substantially in parallel. In some examples, the same channel access parameters, such as the backoff counter, channel access priority classes, and the like, may be the same or similar for the plurality of omnidirectional channel access procedures. In some example embodiments, the network device 110 may perform Cat4 channel access procedures at the beginning of the time period, which allows for a relative long monitoring/sensing duration.

Depending on the possible usage of the shared channel by other devices, the plurality of omnidirectional channel access procedures may each be failed or successful. In some example embodiments, if any one of the plurality of omni-directional channel access procedures is successful, the network device 110 may determine that the plurality of SSBs can be transmitted as each omnidirectional sensing beams used for the omnidirectional channel access procedure is associated with the plurality of SSBs. For each omnidirectional sensing beam with which the successful omnidirectional channel access procedure is performed, the network device 110 may determine respective transmission beams for the plurality of the SSBs based on the omnidirectional sensing beam. In some example embodiments, each of the transmission beams for a SSB may be determined to overlap with a part of the omnidirectional sensing beam. Generally, a transmission beam for a SSB partially overlaps with the omnidirectional sensing beam, and the transmission beams for the plurality of SSBs totally overlaps with the whole coverage area of the omnidirectional sensing beam.

In the example of FIG. 5A, omnidirectional channel access procedures in omnidirectional sensing beam0 and omnidirectional sensing beam2 are successful. The network device 110 may determine respective transmission beams for transmitting SSB0 to SSB1. For each SSB, two transmission beams may be determined, each overlapping with one of the omnidirectional sensing beam0 and omnidirectional sensing beam2. The two transmission beams may cover Transmission beam-P1 and/or Transmission beam-P3 of the SSB. In some examples, if the two or more omnidirectional sensing beams, with which the successful channel access procedures are performed, have adjacent coverage areas, the network device 110 may merge the adjacent coverage areas of the two or more omnidirectional sensing beams and determine a single transmission beam for each SSB that partially covers the merged coverage area. In some example embodiments, two or more separate narrower transmission beams may be determined.

In some example embodiments, if at least one omnidirectional channel access procedure is failed, the network device 110 may determine that the plurality of SSBs may be partially transmitted, not transmitted to a coverage area of one or more omnidirectional sensing beams with which the failed channel access procedures are performed. For example, in FIG. 5A, SSB0 to SSB5 may not be transmitted to the coverage areas of the omnidirectional sensing beam1 due to the failed omnidirectional channel access procedure.

With the transmission beam(s) for SSB0 to SSB5 is determined, the network device 110 may transmit SSB0 to SSB5 sequentially in their respective time slots during the time period (e.g., a COT) available for SSB transmission. In the example of FIG. 5A, the network device 110 is configured to perform no channel access immediately before each SSB transmission switching in the middle of the time period.

In some example embodiments, if all the plurality of omnidirectional channel access procedures performed at the beginning of the time period for SSB transmissions are failed, the network device 110 may perform a plurality of further omnidirectional channel access procedures again with the plurality of omnidirectional sensing beams during the time period. The network device 110 may continue to determine how the SSBs are transmitted based on the results of those plurality of further omnidirectional channel access procedures in a similar way. FIG. 5B illustrate such an example SSB transmission scheme 510. In this example, the three omnidirectional channel access procedures performed at the beginning of the time period are failed. The network device 110 may continue to perform three omnidirectional channel access procedures using the three omnidirectional sensing beams.

In some examples, as the further omnidirectional channel access procedures are performed during the time period for SSB transmissions, one or more time slots for transmitting one or more SSBs may lapse after the completion of the further omnidirectional channel access procedures. In this case, those SSBs may not be transmitted. If one or more of the further omnidirectional channel access procedures are successful, the network device 110 may determine a subset of the plurality of SSBs that are available for transmission after the completion of the further omnidirectional channel access procedures. In the example of FIG. 5B, the network device 110 may determine, after the competition of the omnidirectional channel access procedures performed before a time slot for SSB1, that SSB1 to SSB5 can still be transmitted, while SSB0 may not be transmitted based on the results of the omnidirectional channel access procedures. Since the omnidirectional channel access procedures on sensing beam0 and sensing beam2, the transmission beams determined for SSB1 to SSB5 may be similar as those determined in the example of FIG. 5A.

If the plurality of SSBs are partially transmitted due to one or more failed channel access procedures are performed, the network device 110 may attempt to transmit the plurality of SSBs in their next configured time slots (if exist) within the time period available for SSB transmission. For each omnidirectional sensing beam with which a failed omnidirectional channel access procedure occurs, the network device 110 may perform a further omnidirectional channel access procedure using the omnidirectional sensing beam. The further omnidirectional channel access procedure may be performed during the time period available for SSB transmission and before a next earliest time slot configured for the SSBs. As illustrated in the example SSB transmission scheme 520 in FIG. 5C, the network device 110 performs a further omnidirectional channel access procedure with omnidirectional sensing beam1.

The following transmissions of the SSBs depend on the result of the one or more further omnidirectional channel access procedures. If an omnidirectional directional channel access procedure is successful, the first device 110 may determine a plurality transmission beams for the plurality of SSBs (e.g., SSB0 to SSB5). The determined transmission beams may overlap with the omnidirectional sensing beam (e.g., sensing beam1 in FIG. 5C). The network device 110 may transmit SSB0 to SSB5 using the determined transmission beams sequentially the time slots configured for those SSBs.

Example Pseudo-Omnidirectional Channel Access-Based SSB Transmission

In some example embodiments, the network device 110 may use a plurality of groups of wide sensing beams to perform the plurality of channel access procedures (referred to as pseudo-omnidirectional channel access procedures). Each group of wide sensing beams is associated with two or more of the plurality of signals (e.g., SSBs) to be transmitted, and thus each wide sensing beam in the group is also associated with two or more SSBs. Accordingly, the sensing beams and the SSBs have a multiple-to-multiple association relationship, as described above. In some example embodiments, the network device 110 may reference to Table 1 to determine the association between the sensing beams and the SSBs. For example, sensing beams indexed with "b00, b01, . . . , b0x" may be associated with the plurality of signals (e.g., SSBs here) indexed with "0, 1, . . . , k," sensing beams indexed with "b10, b11, . . . , b1y" may be associated with the plurality of signals (e.g., SSBs here) indexed with "k+1, k+2, . . . , j," and so on.

Figure 6:
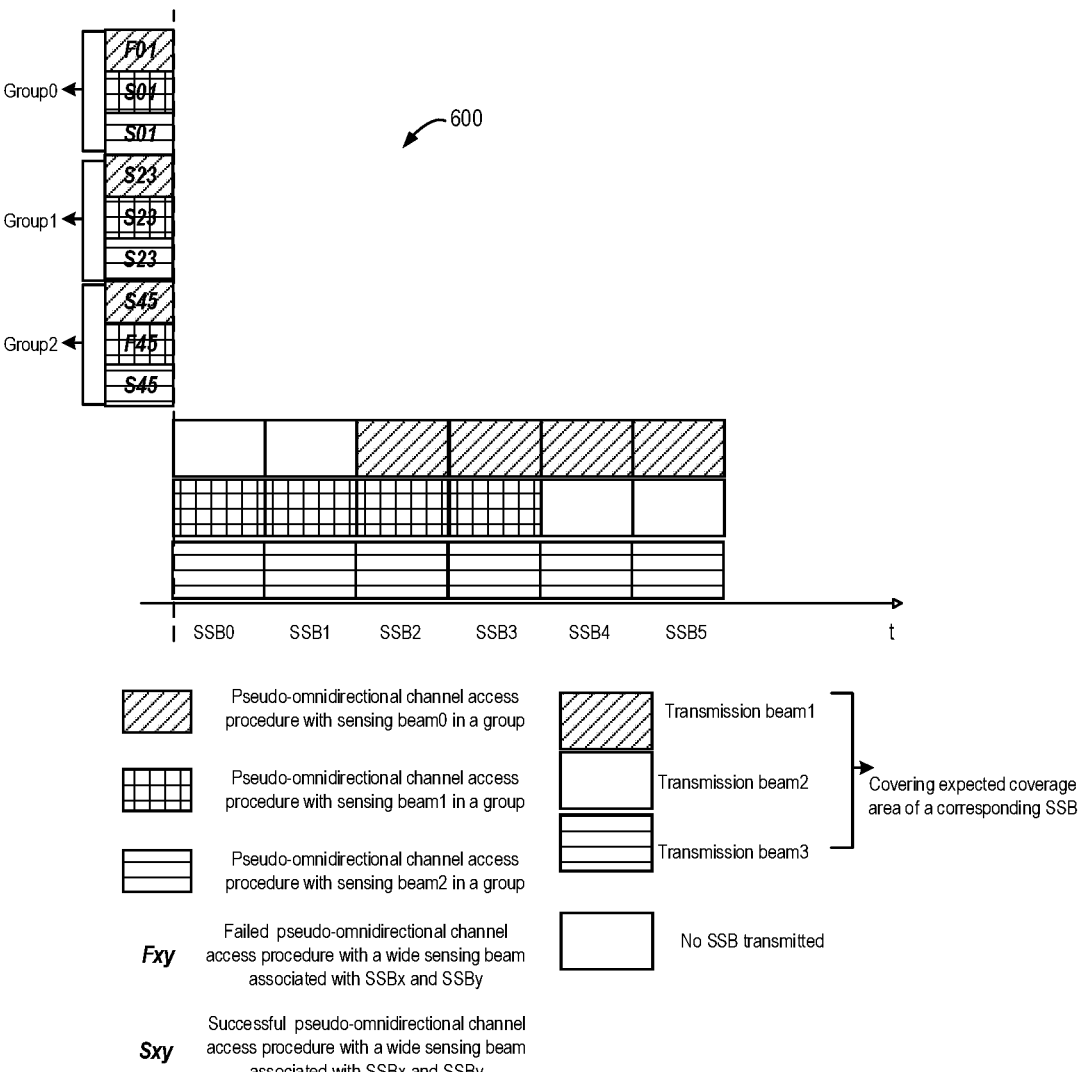
FIG. 6 illustrates an example SSB transmission scheme based on pseudo-omnidirectional channel access according to some embodiments of the present disclosure.

FIG. 6 illustrates an example SSB transmission scheme 600 based on pseudo-omnidirectional channel access according to some embodiments of the present disclosure. Each group comprises at least two wide sensing beams and each wide sensing beams are associated with at least two of the plurality of signals (e.g., SSBs).

In the illustrated example in FIG. 6, there are three groups (numbered as Group0 to Grop2) of directional sensing beams associated with the six SSBs (numbered as SSB0 to SSB5), respectively, each group including three wide sensing beams (numbered as sensing beam0, sensing beam1, and sensing beam2). It is to be noted that although the sensing beams in different groups are not the same. Each wide sensing beam within Group0 is associated with SSB0 and SSB1, each wide sensing beam within Group1 is associated with SSB2 and SSB3, and each wide sensing beam within Group2 is associated with SSB4 and SSB5. It would be appreciated that the association is an example and each wide sensing beam may cover more than two SSBs.

Each wide sensing beam within a group is determined to partially cover an expected coverage area of the associated two or more SSBs. The beam direction of such wide sensing beam is wider than a directional sensing beam cover a single SSB. The two or more wide sensing beams within a group may have a total coverage area overlapped with the expected coverage areas of the associated two or more SSBs. For example, three sensing beams in Group0 in FIG. 6 have a total coverage area equal to or larger than a union of the expected coverage areas of SSB0 and SSB1. The other groups of wide sensing beams may also be likewise determined.

In some example embodiments, the numbers of wide sensing beams in different groups may be the same or different. Thus, although the six groups in FIG. 6 are illustrated to have a same number of three wide sensing beams, those groups may each have a different number of wide sensing beams.

The network device 110 may perform a plurality of pseudo-omnidirectional channel access procedures on the shared channel with respective wide sensing beams in the plurality of groups. For each wide sensing beam, a pseudo-omnidirectional channel access procedure may be performed. In some example embodiments, the plurality of pseudo-omnidirectional channel access procedures may be performed before the time period available for SSB transmission, for example, at the beginning of COT. In some example embodiments, the plurality of pseudo-omnidirectional channel access procedures may be performed substantially in parallel. In some examples, the same channel access parameters, such as the backoff counter, channel access priority classes, and the like, may be the same or similar for the plurality of pseudo-omnidirectional channel access procedures. In some example embodiments, the network device 110 may perform Cat4 channel access procedures at the beginning of the time period, which allows for a relative long monitoring/sensing duration.

Depending on the possible usage of the shared channel by other devices, the plurality of pseudo-omnidirectional channel access procedures may each be failed or successful. In some example embodiments, for each group of pseudo-omnidirectional sensing beams that associated with certain two or more SSBs, if the sensing results of all the pseudo-omnidirectional sensing beams are successful, i.e., the pseudo-omnidirectional channel access procedures performed with the wide sensing beams are successful, the network device 110 may determine that the two or more SSBs can be transmitted and their transmission beams may be determined based on the wide sensing beams. In some examples, the respective transmission beams for the two or more SSBs based on determined as their expected transmission beam.

In the example of FIG. 6, directional channel access procedures performed with the three directional sensing beams in Group1 are all successful, and transmission beams for the associated SSBs (e.g., SSB2 and SSB3) may be determined as their expected transmission beams each covering their expected coverage area. In FIG. 6, each of the transmission beams for SSB2 and SSB3 is illustrated to cover the three transmission beam parts (Transmission beam-P1, Transmission beam-P2, and/or Transmission beam-P3).

In some example embodiments, if at least one pseudo-omnidirectional channel access procedure performed with at least one wide sensing beam in a certain group is successful while one or more other pseudo-omnidirectional channel access procedure are failed, the network device 110 may determine that the associated two or more SSBs may be partially transmitted based on the at least one wide sensing beam with which the at least one successful pseudo-omni-directional channel procedure is performed. In some example embodiments, for each associated SSB, one or more transmission beams may be determined to partially or totally overlap with the at least one wide sensing beam. A total coverage area of the transmission beams determined for the two or more associated SSBs may be substantially equal to or smaller than a total coverage area of the at least one wide sensing beam.

In the illustrated example in FIG. 6, in Group0, pseudo-omnidirectional channel access procedures performed with sensing beam1 and sensing beam2 are successful while the pseudo-omnidirectional channel access procedure performed with sensing beam0 is failed, the network device 110 may determine one or more transmission beams for transmitting SSB0 and one or more transmission beams for transmitting SSB1 based on sensing beam0 and sensing beam1. For Group2, the network device 110 may similarly determine the transmission beams for SSB4 and SSB5 based on sensing beam0 and sensing beam2 with which the successful pseudo-omnidirectional channel access procedure are performed.

In some examples, if the two or more wide sensing beams within a group, with which the successful channel access procedures are performed, have adjacent coverage areas, the network device 110 may merge determine a single transmission beam for each associated SSB that partially cover a merged area of the adjacent coverage areas. In some example embodiments, two or more separate narrower transmission beams may be determined.

With the transmission beam(s) for one or more of SSB0 to SSB5 is determined, the network device 110 may transmit the SSBs sequentially in their respective time slots during the time period (e.g., a COT) available for SSB transmission. In the example of FIG. 6, the network device 110 is configured to perform no channel access immediately before each SSB transmission switching in the middle of the time period.

In some example embodiments, if one or more of the plurality of performed pseudo-omnidirectional channel access procedures are failed, the network device 110 may determine that one or more SSBs may not be transmitted at least to a coverage area of one or more wide sensing beams with which the failed channel access procedures are performed. In some examples, for a certain SSB associated with a group of wide sensing beams, if one or more of the corresponding pseudo-omnidirectional channel access procedures are successful but one or more others are failed, the SSB may be partially transmitted. The network device 110 may not transmit the SSB to the coverage area of the sensing beam(s) with which a failed channel access procedure(s) is performed. For example, in FIG. 6, SSB0 and SSB1 associated with Group0 and SSB4 and SSB5 associated with Group2 are partially transmitted. SSB0 and SSB1 are not transmitted to the coverage areas covered by their Transmission-beam P3 due to the failed pseudo-omnidirectional channel access procedure, and SSB4 and SSB5 are not transmitted to the coverage areas covered by their Transmission-beam P2 due to the failed pseudo-omnidirectional channel access procedure.

In some example embodiments, if one or more SSBs are not transmitted or partially transmitted due to one or more failed channel access procedures, the network device 110 may attempt to transmit the one or more SSBs in their next configured time slots (if exist) within the time period available for SSB transmission. For each wide sensing beam with which a failed pseudo-omnidirectional channel access procedure occurs, the network device 110 may perform a further pseudo-omnidirectional channel access procedure using the wide sensing beam. The further pseudo-omnidirectional channel access procedure may be performed during the time period available for SSB transmission and before a next time slot configured for the SSBs associated with the wide sensing beam.

In the example of FIG. 6, if there are further time slots configured for transmission of SSB0 and SSB1 after the time slot for the last SSB (e.g., SSB5), the network device 110 may transmit a further pseudo-omnidirectional channel access procedure (not shown) using sensing beam0 in Group0. The directional channel access procedure may be performed before the further time slots configured for transmission of SSB0 and SSB1. For SSB4 and SSB5, the network device 110 may similarly perform a further pseudo-omnidirectional channel access procedure in order to transmit the two SSBs. Depending on the result of the further pseudo-omnidirectional channel access procedure, the network device 110 may determine whether and how the SSBs can be transmitted in a similar way as discussed above.

Further Example Directional Channel Access-Based SSB Transmission

In some example embodiments, the channel access procedures for the SSBs may not be performed in parallel before the time period for SSB transmission. The network device 110 may perform channel access procedures during the time period in response to the SSB transmission switching (e.g., switching from one SSB to another SSB, or from a subset of SSBs to another subset of SSBs). The network device 110 may perform different SSB transmission schemes depending on the directional, wide, and/or omnidirectional sensing beams used. An example directional channel access-based SSB transmission scheme is first introduced with reference to FIG. 7A-7B.

Figure 7A:
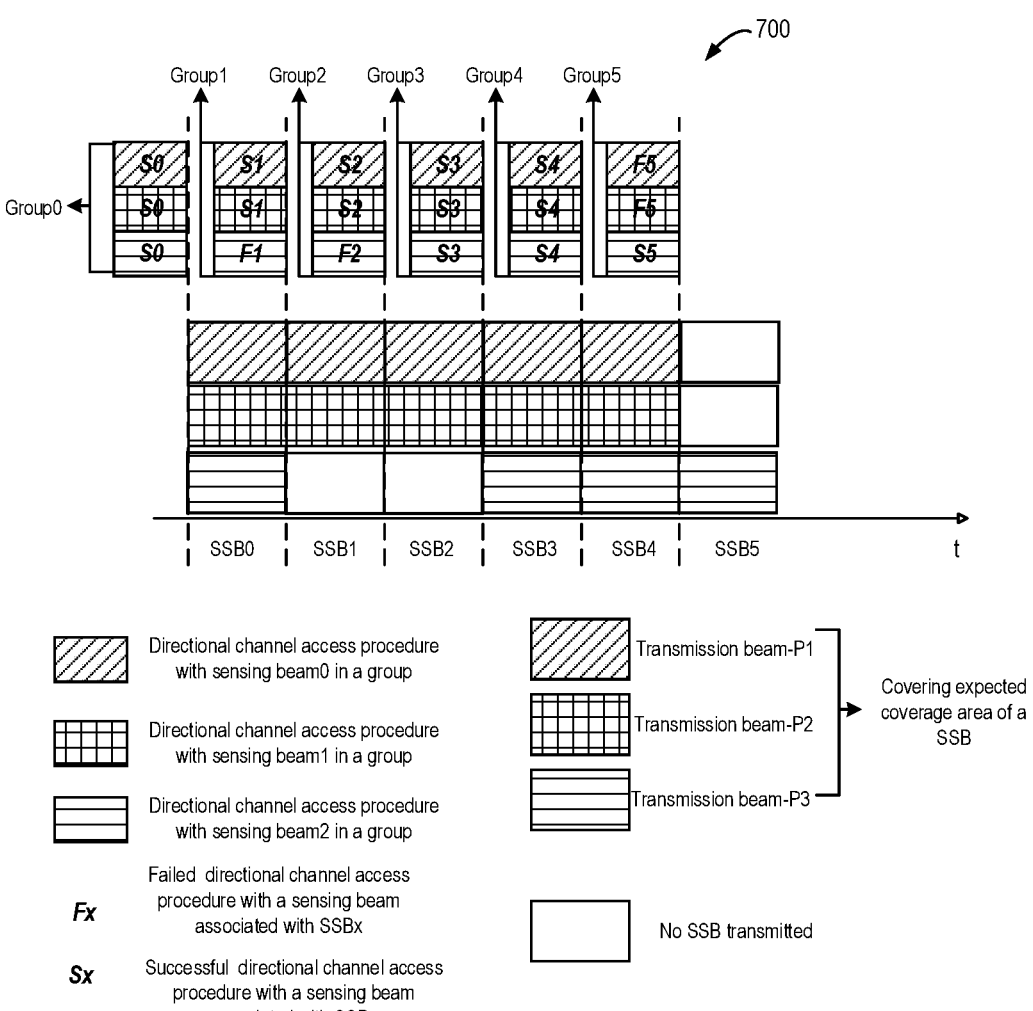
FIGS. 7A-7B illustrate further example SSB transmission schemes based on directional channel access according to some embodiments of the present disclosure.

In an example SSB transmission scheme 700 illustrated in FIG. 7A, the network device 110 performs a plurality of directional channel access procedures using a plurality of groups of directional sensing beams (similar as in FIG. 4). The difference is that the network device 110 performs directional channel access procedures with different groups of directional sensing beams during the time period for SSB transmissions and before the time slots for transmitting the respective associated SSBs.

In particular, the network device 110 may perform a plurality of directional channel access procedures with directional sensing beams in Group0 associated with the first SSB, i.e., SSB0, before the time period available for SSB transmission, for example, at the beginning of COT. The network device 110 may further perform a plurality of directional channel access procedures with directional sensing beams in Group1 associated with SSB1 during the time period and before a time slot available for transmission of SSB1. The directional channel access procedures for the following SSBs may be similarly performed.

In some example embodiments, the plurality of directional channel access procedures for each group of directional sensing beams may be performed substantially in parallel. In some examples, the same channel access parameters, such as the backoff counter, channel access priority classes, and the like, may be the same or similar for the plurality of directional channel access procedures for each group of directional sensing beams. In some example embodiments, the network device 110 may perform category 2 (Cat2) channel access procedures at the beginning of time period, which allows for a relative short monitoring/sensing duration. A Cat2 channel access procedure may also be referred to as Type 2 channel access procedure, which may include, for example, Type 2A channel access procedure, Type 2B channel access procedure, or the like. According to the Cat2 channel access procedure, the network device 110 may transmit a signal immediately after sensing the channel to be idle for at least a sensing interval (for example, an interval of 25 us, 16 us, or others). With a successful Cat2 channel access procedure, the network device 110 may have a transmission duration, for example, a duration smaller than or equal to 1 ms.

Depending on the results of the directional channel access procedures performed for each group of directional sensing beams, the network device 110 may determine whether the associated SSB can be transmitted and determine the transmission beam(s) for the associated SSB(s) if the one or more directional channel access procedures for the group are successful. The determination of the transmission beams and the transmission of the SSBs may be similar to those as discussed with reference to FIG. 4.

As illustrated in FIG. 7A, depending on the results of the directional channel access procedures, SSB0, SSB3, and SSB4 are fully transmitted, while SSB1, SSB2, and SSB5 are partially transmitted.

Figure 7B:
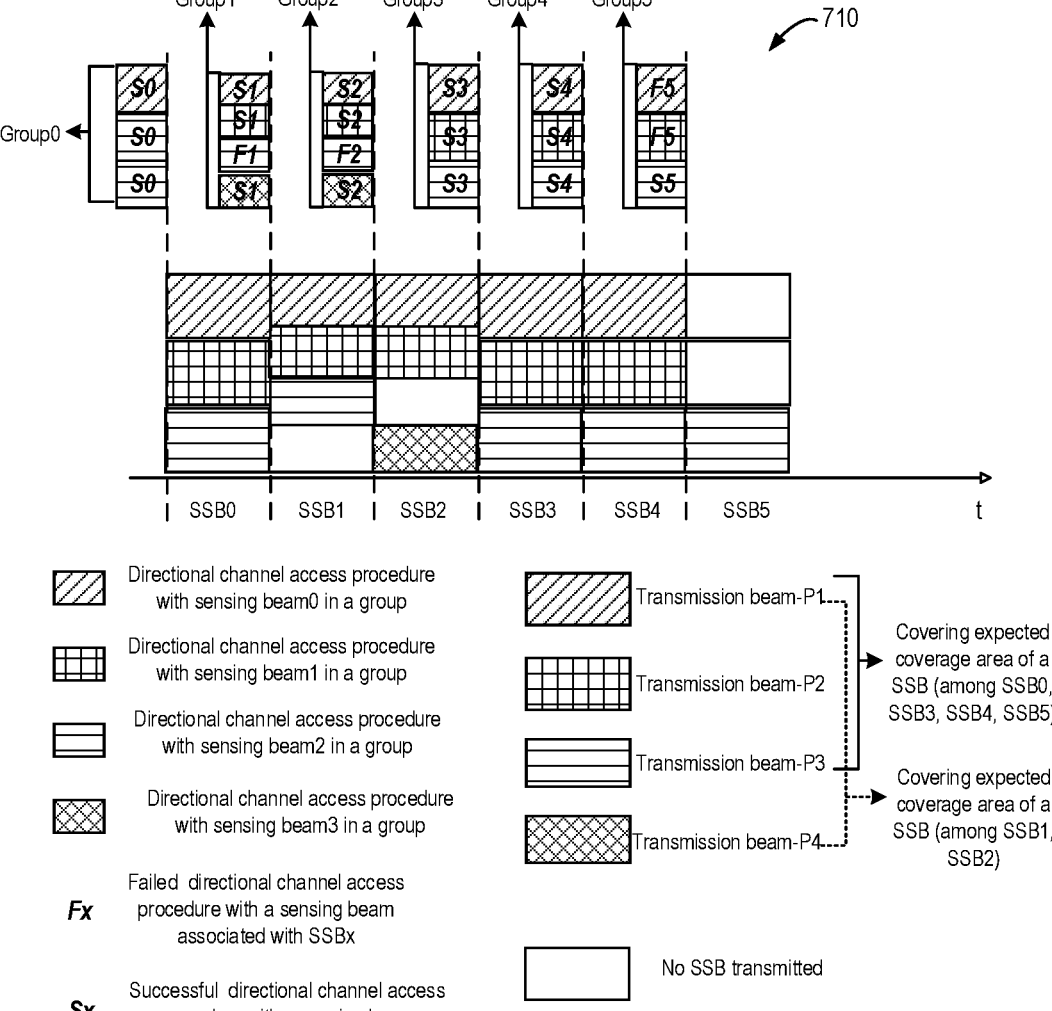

In some example embodiments, the number of directional sensing beams in the plurality of groups may not be the same. That is, the granularity of associated sensing beams for each SSB may be varied. FIG. 7B illustrates such an example transmission scheme 710. In this example, there are three directional sensing beams (numbered as sensing beam0, sensing beam1, sensing beam2) in each of Group0, Group 4, and Group5 associated with SSB0, SSB3, SSB4, and SSB5. There are four directional sensing beams (numbered as sensing beam0, sensing beam1, sensing beam2, sensing beam3) in each of Group1 and Group2 associated with SSB1 and SSB2.

The transmission beams for SSB1 and SSB2 may be determined in a finer granularity based on the results of the directional channel access procedures performed with the associated sensing beams. For example, after performing the directional channel access procedures with the directional sensing beams in Group1, the network device 110 determines that the directional channel access procedures performed with sensing beam0, sensing beam1, and sensing beam2 are successful and thus may determine one or more transmission beams overlapping with those sensing beams to transmit SSB1. SSB1 may not be transmitted to the small part of the coverage area covered by sensing beam3. For Group2, depending on the results of the directional channel access procedures, one or more transmission beams for SSB2 may be determined to overlap with sensing beams0, sensing beam1, and sensing beam 3.

In some example embodiments, for one or more SSBs that are not transmitted or partially transmitted, the network device 110 may also attempt to transmit such SSBs in their next configured time slots (if exist) within the time period available for SSB transmission, for example, by performing further directional channel access procedures. The re-attempted transmission of SSBs for failed directional channel access procedures may be similar as discussed with reference to FIG. 4.

Example Pseudo-Omnidirectional Channel Access-Based SSB Transmission

Figure 8:
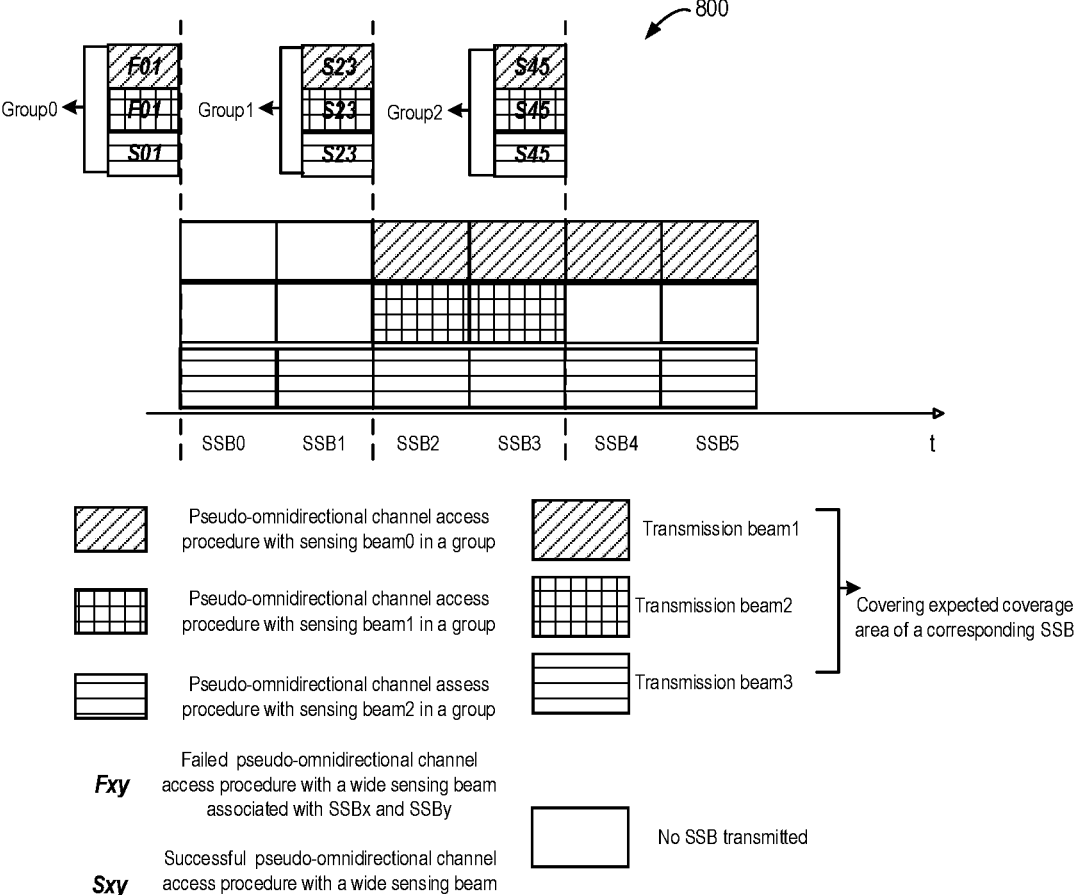
FIG. 8 illustrates a further example SSB transmission scheme based on pseudo-omnidirectional channel access according to some embodiments of the present disclosure.

In some example embodiments, the network device 110 may perform pseudo-omnidirectional channel access procedures during the time period in response to the SSB transmission switching (e.g., switching from a subset of SSBs to another subset of SSBs). FIG. 8 illustrates such an example SSB transmission scheme 800 based on pseudo-omnidirectional channel access according to some embodiments of the present disclosure.

In an example SSB transmission scheme 800 illustrated in FIG. 8, the network device 110 performs a plurality of pseudo-omnidirectional channel access procedures using a plurality of groups of directional sensing beams (similar as in FIG. 6). The difference is that the network device 110 performs pseudo-omnidirectional channel access procedures with different groups of wide sensing beams before and during the time period for SSB transmissions.

In particular, the network device 110 may perform a plurality of pseudo-omnidirectional channel access procedures with wide sensing beams in Group0 associated with the first subset of SSBs, i.e., SSB0 and SSB1, before the time period available for SSB transmission, for example, at the beginning of COT. The network device 110 may further perform a plurality of pseudo-omnidirectional channel access procedures with wide sensing beams in Group1 associated with SSB2 and SSB3 during the time period and before the earlier time slot available for transmission of SSB2. The pseudo-omnidirectional channel access procedures for the following SSBs may be similarly performed.

In some example embodiments, the plurality of pseudo-omnidirectional channel access procedures for each group of wide sensing beams may be performed substantially in parallel. In some examples, the same channel access parameters, such as the backoff counter, channel access priority classes, and the like, may be the same or similar for the plurality of pseudo-omnidirectional channel access procedures for each group of wide sensing beams. In some example embodiments, the network device 110 may perform Cat2 channel access procedures, which allows for a relative short monitoring/sensing duration.

Depending on the results of the pseudo-omnidirectional channel access procedures performed for each group of directional sensing beams, the network device 110 may determine whether the associated SSBs can be transmitted and determine the transmission beam(s) for the associated SSB(s) if the one or more pseudo-omnidirectional channel access procedures for the group are successful. The determination of the transmission beams and the transmission of the SSBs may be similar to those as discussed with reference to FIG. 6.

As illustrated in FIG. 8, depending on the results of the pseudo-omnidirectional channel access procedures, SSB2 and SSB3 associated with Group1 are fully transmitted, while SSB and SSB1 associated with Group0, SSB4 and SSB5 associated with Group2 are partially transmitted.

In some example embodiments, for some SSBs that are not transmitted or partially transmitted, the network device 110 may also attempt to transmit such SSBs in their next configured time slots (if exist) within the time period available for SSB transmission, for example, by performing further pseudo-omnidirectional channel access procedures. The re-attempted transmission of SSBs for failed directional channel access procedures may be similar as discussed with reference to FIG. 6.

Omnidirectional/Directional Channel Access-Based SSB Transmission

In some example embodiments, the network device 110 may use different types of sensing beams to perform the channel access procedures.

Figure 9:
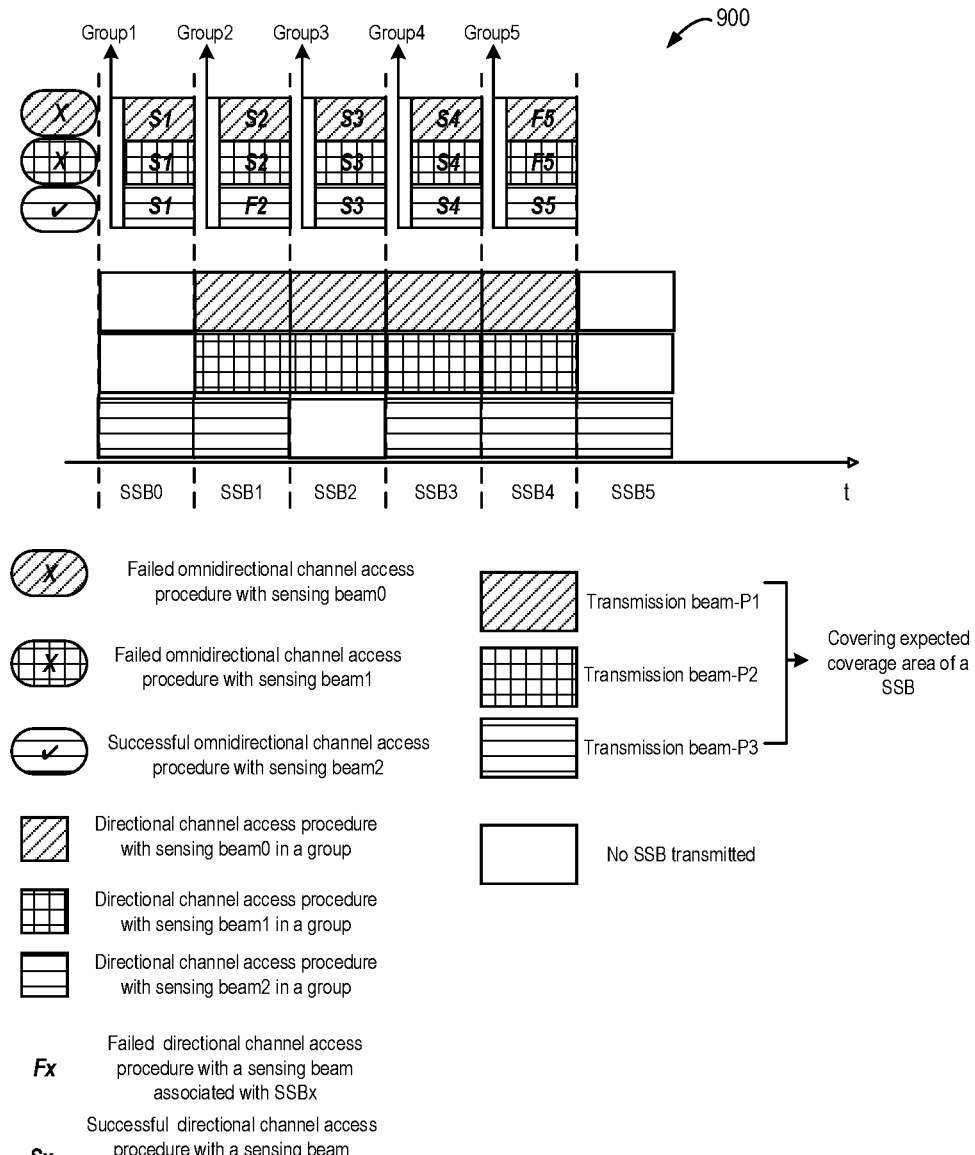
FIG. 9 illustrates an example SSB transmission scheme based on omnidirectional channel access and directional channel access according to some embodiments of the present disclosure.

FIG. 9 illustrates an example SSB transmission scheme 900 based on omnidirectional channel access and directional channel access according to some embodiments of the present disclosure. In this transmission scheme 900, the network device 110 uses a plurality of omnidirectional sensing beams and a plurality of groups of directional sensing beams to perform the channel access procedures.

In particular, the network device 110 may perform a plurality of omnidirectional channel access procedures with the plurality of omnidirectional sensing beams before the time period available for SSB transmission, for example, at the beginning of COT. In some examples, the same channel access parameters, such as the backoff counter, channel access priority classes, and the like, may be the same or similar for the plurality of omnidirectional channel access procedures for each omnidirectional sensing beam. In some example embodiments, the network device 110 may perform Cat2 of channel access procedures, which allows for a relative short monitoring/sensing duration.

Depending on the results of the omnidirectional channel access procedures, the network device 110 may determine whether one or more first SSB, e.g., SSB0, can be transmitted. The determination of the transmission beams and the transmission of the SSB may be similar to those as discussed with reference to FIG. 5A-5C.

In addition, the network device 110 may perform a plurality of directional channel access procedures with a plurality of groups of directional sensing beams before the following time periods available for SSB transmission. In example of FIG. 9, as SSB0 can be transmitted based on the result of the omnidirectional channel access procedures, a plurality of groups (numbered as Group 1 to Group5) of directional sensing beams associated with other SSBs, such as SSB1 to SSB5, may be used to perform the directional channel access procedures.

The network device 110 may further perform a plurality of directional channel access procedures with each group of directional sensing beams the time period for SSB transmissions and before the time slot for transmitting the associated SSB. As illustrated in FIG. 9, the network device 110 may perform directional channel access procedures with directional sensing beams in Group1 associated with SSB1 before a time slot available for transmission of SSB1. The directional channel access procedures for the following SSBs may be similarly performed.

In some example embodiments, the plurality of directional channel access procedures for each group of directional sensing beams may be performed substantially in parallel. In some examples, the same channel access parameters, such as the backoff counter, channel access priority classes, and the like, may be the same or similar for the plurality of directional channel access procedures for each group of directional sensing beams. In some example embodiments, the network device 110 may perform a category 2 (Cat2) of channel access procedures at the beginning of the time period, which allows for a relative short monitoring time period.

Depending on the results of the directional channel access procedures performed for each group of directional sensing beams, the network device 110 may determine whether the associated SSB can be transmitted and determine the transmission beam(s) for the associated SSB(s) if the one or more directional channel access procedures for the group are successful. The determination of the transmission beams and the transmission of the SSBs may be similar to those as discussed with reference to FIG. 4.

Since a category of channel access procedure allowing for a relative short monitoring time period is used to perform the omnidirectional channel access, the network device 110 may not need to monitor for a long time before the time period for SSB transmission. In addition, by performing the directional channel access during the time period to determine whether the later SSBs can be transmitted, the probability of communication collision and failure can be further reduced.

In some example embodiments, for some SSBs that are not transmitted or partially transmitted, the network device 110 may also attempt to transmit such SSBs in their next configured time slots (if exist) within the time period available for SSB transmission, for example, by performing further directional or omnidirectional channel access procedures. The re-attempted transmission of SSBs for failed channel access procedures may be similar as discussed with reference to FIG. 4 and FIG. 5A-5C.

In some example embodiments, the results of the omnidirectional channel access procedures may be used to determine whether two or more first SSBs, e.g., SSB0 and SSB1, can be transmitted. In such case, the directional channel access procedures for Group0 may not be performed. The use of the omnidirectional channel access procedures may depend on the monitoring time of such channel access procedures. If the monitoring time is relatively large, the results of the omnidirectional channel access procedures may be determined to be valid for determining the transmission beam(s) for SSB1.

In some example embodiments, instead of using one or more groups of directional sensing beams, one or more groups of wide sensing beams may be used to perform the channel access procedures during the time period for SSB transmission. For example, in FIG. 9, for SSB4 and SSB5, the network device 110 may use a group of wide sensing beams, such as Group2 in FIG. 6 or FIG. 8, to perform the pseudo-omnidirectional channel access procedures. The transmissions of SSB4 and SSB5 may be based on the results of the pseudo-omnidirectional channel access procedures, and their transmission beams may be determined based on the wide sensing beams with which the successful pseudo-omnidirectional channel access procedures are performed, which is similar as discussed in FIG. 6 and FIG. 8.

Example Threshold Determination

As mentioned above, in performing a channel access procedure, an energy detection threshold may be used to determine if the shared channel is being used before transmission on the channel. In some example embodiments, directional or pseudo-omnidirectional channel access procedures may be performed and a SSB may be transmitted partially or fully with different transmission beams covering different coverage areas. The network device 110 may use different transmission powers to transmit the SSB depending on the transmission beams determined for this SSB.

In some example embodiments, the energy detection threshold used in a channel access procedure may be determined based on the transmission power difference for different transmission beams. Specifically, it is assumed that a plurality of channel access procedures are to be performed with a group of non-omnidirectional sensing beams associated with a target signal (e.g., SSB). Here, a group of non-omnidirectional sensing beams may include a group of directional sensing beam (e.g., in FIG. 4, FIGS. 7A-7B, and FIG. 9) or a group of pseudo-omnidirectional sensing beam (e.g., in FIG. 6 and FIG. 8)

The network device 110 may determine an energy detection threshold for a target non-omnidirectional sensing beam within the group based on a power-related parameter. The power-related parameter is determined based on a difference between a first transmission power for a first transmission beam and a second transmission power for a second transmission beam. Here, the first transmission beam has a first coverage area overlapped with a total coverage area of the group of non-omnidirectional sensing beams, and the second transmission beam has a second coverage area overlapped with the target non-omnidirectional sensing beam.

Take a group of directional sensing beam in FIG. 4 as an example. The network device 110 may determine a difference between a transmission power for an expected transmission beam for SSB0 (which overlaps with the total coverage area of sensing beam0, sensing beam1, and sensing beam 2 in Group0) and a transmission power for a transmission beam overlapping with sensing beam0 in Group0. The network device 110 may determine an energy detection threshold used in a directional channel access procedure performed with sensing beam0 based on the difference of the transmission powers.

In some example embodiments, the network device 110 may adjust an energy detection threshold used for a channel access procedure based on the power-related parameter (which may be a value proportional to the difference of the transmission powers). In some example embodiments, the network device 110 may use the power-related parameter as an offset to adjust the set maximum output power that is used to determine an energy detection threshold according to the communication specifications.

The set maximum output power may be determined as follow: $P'_{TX} = P_{TX} + D2$, where $P_{TX}$ is the set maximum output power in dBm for the shared channel, and D2 is an offset in dBm determined from the power-related parameter. The network device 110 may use the adjusted maximum output power $P'_{TX}$ to determine the energy detection threshold. For example, the determination of the energy detection threshold in a specification is as follows:

$$X_{Thresh\_max} = \max$$

$$\left\{ \min\left\{ \begin{array}{c} -72 + 10 \cdot \log10(BW\,\text{MHz}/20\,\text{MHz})dBm, \\ T_{max}, \\ T_{max} - T_A + (P_H + 10 \cdot \log10(BW\,\text{MHz}/20\,\text{MHz}) - P_{TX}) \end{array} \right\} \right\}$$

<div align="right">Eq(1)</div> where $X_{Thresh\_max}$ is the energy detection threshold, $T_A$ and $P_H$ is a preset value, BWMHz is the single channel bandwidth in MHz, and $P_{TX}$ is the set maximum output power, which may be adjusted to be $P'_{TX}$ as discussed above.

It would be appreciated that the power-related parameter determined above may be used in other ways to determine the energy detection threshold used in a channel access procedure.

The network device 110 may use the determined energy detection threshold to perform a channel access procedure with the target non-omnidirectional sensing beam based on the determined energy detection threshold. In this way, the network device 110 can use more suitable energy detection thresholds in different directional or pseudo-omnidirectional channel access procedures.

In some example embodiments, in addition to the difference of the transmission powers or as an addition, the energy detection threshold used in a channel access procedure performed with the non-omnidirectional sensing beam may be determined based on the beamforming gain from a directional or pseudo-omnidirectional channel access procedure compared with an omnidirectional channel access procedure, an technology utilized for sharing the shared channel, and/or other factors.

Example Operation at Terminal Device

One or more terminal device 120 in the cell 102 of the network device 110 may detect the SSBs transmitted from the network device 110 on the shared channel. Depending on their relative positioning to the network device 110, a terminal device 120 may receive one of the plurality of SSBs transmitted by the network device 110 using different transmission beams.

In some example embodiments, as mentioned above, the network device 110 may determine two or more separate transmission beams for a same SSB. In this case, on the side of the terminal device 120, it may receive a SSB over two or more transmission beams. Each transmission beam may be considered as carrying a replica of the SSB. The terminal device 120 may combine the replicas of the SSB in manner of utilizing transmit diversity signals of the network device 110. As such, the probability of successful decoding of the SSB may be increased.

Example Device

Figure 10:
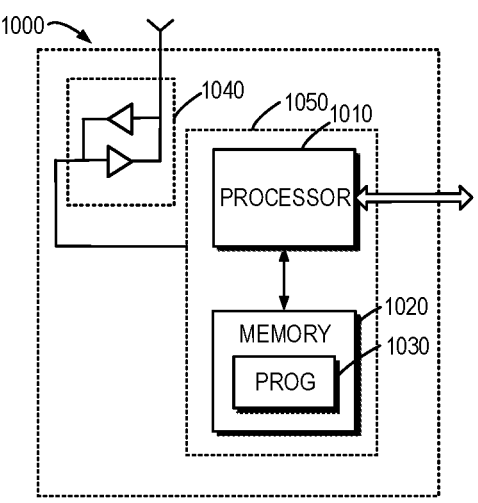
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the network device 110, or the terminal device 120 as shown in FIG. 1. Accordingly, the device 1000 can be implemented at or as at least a part of the network device 110, or the terminal device 120.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1020 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 2 to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Example Embodiments

In some embodiments, a network device comprises a processing unit; and a memory coupled to the processing unit and storing instructions thereon, the instructions, when executed by the processing unit, causing the device to perform act comprising: performing a plurality of channel access procedures on a shared channel with a plurality of sensing beams, each of the plurality of sensing beams being associated with at least one of a plurality of signals, the plurality of signals comprising a plurality of synchronization signal blocks (SSBs); in accordance with a determination that at least one of the plurality of channel access procedures is successful, determining at least one transmission beam for at least one of the plurality of signals based on at least one of the plurality of sensing beams with which the at least one successful channel access procedure is performed; and transmitting the at least one signal on the shared channel using the at least one transmission beam.

In some example embodiments, the plurality of sensing beams comprises a first plurality of groups of directional sensing beams, each group comprising at least two directional sensing beams and being associated with a respective one of the plurality of signals. In some example embodiments, performing the plurality of channel access procedures comprises: performing a plurality of directional channel access procedures on the shared channel with respective directional sensing beams in the first plurality of groups.

In some example embodiments, determining the at least one transmission beam comprises: for a given one of the first plurality of groups, in accordance with a determination of at least one successful directional channel access procedure performed with at least one directional sensing beam in the given group, determining at least one target transmission beam for a target signal associated with the given group from the plurality of signals based on the at least one directional sensing beam.

In some example embodiments, performing the plurality of directional channel access procedures comprises: performing the plurality of directional channel access procedures before a time period available for transmission of the plurality of signals.

In some example embodiments, performing the plurality of directional channel access procedures comprises: performing at least two directional channel access procedures with at least two directional sensing beams in a first group of the first plurality of groups before a first time slot available for transmission of a first signal of the plurality of signals associated with the second group; and performing at least two further directional channel access procedures with at least two further directional sensing beams in a second group of the first plurality of groups before a second time slot available for transmission of a second signal of the plurality of signals associated with the second group.

In some example embodiments, the plurality of sensing beams comprises a second plurality of groups of wide sensing beams, each group comprising at least two wide sensing beams and being associated with at least two of the plurality of signals. In some example embodiments, performing the plurality of channel access procedures comprises: performing a plurality of pseudo-omnidirectional channel access procedures on the shared channel with respective wide sensing beams in the second plurality of groups.

In some example embodiments, determining the at least one transmission beam comprises: for a given one of the second plurality of groups, in accordance with a determination of at least one successful pseudo-omnidirectional channel access procedure performed with at least one wide sensing beam in the given group, determining, based on the at least one wide sensing beam, a plurality of transmission beams for the at least two target signals of the plurality of signals associated with the given group for transmission.

In some example embodiments, performing the plurality of pseudo-omnidirectional channel access procedures comprises: performing the plurality of pseudo-omnidirectional channel access procedures before a time period available for transmission of the plurality of signals.

In some example embodiments, performing the plurality of pseudo-omnidirectional channel access procedures comprises: performing at least two pseudo-omnidirectional channel access procedures with at least two wide sensing beams in a first group of the second plurality of groups before a third time slot available for transmission of at least two signals of the plurality of signals associated with the first group; and performing at least two further pseudo-omnidirectional channel access procedures with at least two further wide sensing beams in a second group of the second plurality of groups before a fourth time slot available for transmission of at least two further signals of the plurality of signals associated with the second group.

In some example embodiments, the plurality of sensing beams comprises a plurality of omnidirectional sensing beams, each of the plurality of omnidirectional sensing beams being associated with the plurality of signals. In some example embodiments, performing the plurality of channel access procedures comprises: performing a plurality of omnidirectional channel access procedures on the shared channel with the plurality of omnidirectional sensing beams.

In some example embodiments, determining the at least one transmission beam comprises: in accordance with a determination that at least one of the plurality of omnidirectional channel access procedures is successful, determining at least a target subset of the plurality of signals that are available for transmission during a time period after a completion of the at least one omnidirectional channel access procedure; and determining a plurality of transmission beams for at least the target subset of signals based on at least one of the plurality of omnidirectional sensing beams with which the at least one omnidirectional channel access procedure is performed.

In some example embodiments, performing the plurality of channel access procedures comprises: performing a first plurality of omnidirectional channel access procedures with the plurality of omnidirectional sensing beams, respectively; and in accordance with a determination that the first plurality of omnidirectional channel access procedures are failed, performing a second plurality of omnidirectional channel access procedures on the shared channel with the plurality of omnidirectional sensing beams, respectively.

In some example embodiments, the plurality of sensing beams further comprises a third plurality of groups of directional sensing beams, each group of directional sensing beams comprising at least two directional sensing beams and being associated with one of the plurality of signals. In some example embodiments, performing the plurality of channel access procedures further comprises: performing the plurality of omnidirectional channel access procedures before a time period available for transmission of the plurality of signals, and performing a plurality of directional channel access procedures on the shared channel with respective directional sensing beams in the third plurality of groups during the time period.

In some example embodiments, determining the at least one transmission beam further comprises: in accordance with a determination that at least one of the plurality of directional channel access procedures is successful, determining, from the plurality of signals, a further target signal associated with a target group, the target group comprising at least one directional sensing beam with which the at least one successful directional channel access procedure is performed; and determining at least one target transmission beam for the further signal based on the at least one directional sensing beam.

In some example embodiments, the acts further comprise in accordance with a determination that a first channel access procedure of the plurality of channel access procedures is failed, determining at least one further signal of the plurality of signals associated with a first sensing beam of the plurality of sensing beams with which the first channel access procedure is performed; and preventing transmission of the at least one further signal on the shared channel to a coverage area of the first sensing beam.

In some example embodiments, the acts further comprise performing a second channel access procedure with the first sensing beam; in accordance with a determination that the second channel access procedure is successful, determining at least one further transmission beam for the at least one further signal based on the first sensing beam; and transmitting the at least one further signal on the shared channel using at least one further transmission beam.

In some example embodiments, the plurality of sensing beams comprising a group of non-omnidirectional sensing beams associated with a target signal of the plurality of signals, and wherein performing the plurality of channel access procedures comprises: determining an energy detection threshold based on a power-related parameter, the power-related parameter being determined from a difference between a first transmission power for a first transmission beam and a second transmission power for a second transmission beam, a first coverage area of the first transmission beam being overlapped with a total coverage area of the group of non-omnidirectional sensing beams, and a second coverage area of the second transmission beam being overlapped with the target non-omnidirectional sensing beam; and performing a channel access procedure with the target non-omnidirectional sensing beam based on the determined energy detection threshold.

In some example embodiments, performing a plurality of channel access procedures on a shared channel with a plurality of sensing beams comprises: performing a plurality of channel access procedures on the shared channel by using a plurality of subsets of antennas.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be is understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A communication method performed by a base station, the method comprising:
performing sensing on a plurality of sensing beams independently on a shared spectrum, wherein the plurality of sensing beams respectively correspond to multiple transmission beams;
determining a single transmission beam covering a merged area of adjacent coverage areas, wherein two or more sensing beams among the plurality of sensing beams cover the adjacent coverage areas, and a channel access procedure on each of the two or more sensing beams has succeeded; and
transmitting a downlink transmission on the single transmission beam.

2. The method of claim 1, wherein the channel access procedure is based on sensing that considers whether a channel in the shared spectrum is idle.

3. The method of claim 2, wherein the downlink transmission is transmitted when the channel is accessed.

4. The method of claim 2 further comprising transmitting a downlink transmission on the channel without sensing the channel.

5. The method of claim 1, wherein a spatial resource for the plurality of sensing beams during the sensing covers the single transmission beam.

6. The method of claim 1, wherein the one of the plurality of sensing beams covers the multiple transmission beams.

7. The method of claim 1, wherein the one of the plurality of sensing beams covers the single transmission beam.

8. The method of claim 1, wherein the channel access procedure is performed before a time period available for transmission.

9. The method of claim 1, wherein a plurality of channel access procedures performed on the plurality of sensing beams are applied simultaneously.

10. A base station, comprising:

a processor configured to cause the base station to:

perform sensing on a plurality of sensing beams independently on a shared spectrum, wherein the plurality of sensing beams respectively correspond to multiple transmission beams;

determine a single transmission beam covering a merged area of adjacent coverage areas, wherein two or more sensing beams among the plurality of sensing beams cover the adjacent coverage areas, and a channel access procedure on each of the two or more sensing beams has succeeded; and transmit a downlink transmission on the single transmission beam.

11. The base station of claim 10, wherein the channel access procedure is based on sensing that considers whether a channel in the shared spectrum is idle.

12. The base station of claim 11, wherein the downlink transmission is transmitted when the channel is accessed.

13. The base station of claim 11 further comprising transmitting a downlink transmission on the channel without sensing the channel.

14. The base station of claim 10, wherein a spatial resource for the plurality of sensing beams during the sensing covers the single transmission beam.

15. The base station of claim 10, wherein the one of the plurality of sensing beams covers the multiple transmission beams.

16. The base station of claim 10, wherein the one of the plurality of sensing beams covers the single transmission beam.

17. The base station of claim 10, wherein the channel access procedure is performed before a time period available for transmission.

18. The base station of claim 10, wherein a plurality of channel access procedures performed on the plurality of sensing beams are applied simultaneously.

\* \* \* \* \*